(12) United States Patent
Sakurai et al.

(10) Patent No.: US 9,494,072 B2
(45) Date of Patent: Nov. 15, 2016

(54) EXHAUST PURIFICATION SYSTEM OF INTERNAL COMBUSTION ENGINE

(71) Applicants: Kenji Sakurai, Gotenba (JP); Kohei Yoshida, Gotenba (JP); Yuki Bisaiji, Susono (JP); Shigeki Nakayama, Gotenba (JP)

(72) Inventors: Kenji Sakurai, Gotenba (JP); Kohei Yoshida, Gotenba (JP); Yuki Bisaiji, Susono (JP); Shigeki Nakayama, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/116,502

(22) PCT Filed: Feb. 20, 2013

(86) PCT No.: PCT/JP2013/054166
§ 371 (c)(1),
(2) Date: Nov. 8, 2013

(87) PCT Pub. No.: WO2014/128860
PCT Pub. Date: Aug. 28, 2014

(65) Prior Publication Data
US 2015/0345358 A1 Dec. 3, 2015

(51) Int. Cl.
*F01N 3/00* (2006.01)
*F01N 9/00* (2006.01)
(Continued)

(52) U.S. Cl.
CPC ............... *F01N 9/00* (2013.01); *F01N 3/101* (2013.01); *F02D 41/0052* (2013.01); *F02D 41/0275* (2013.01); *F02D 41/1454* (2013.01); *F02D 41/1475* (2013.01); *F01N 3/0842* (2013.01); *F01N 2510/0684* (2013.01);
(Continued)

(58) Field of Classification Search
CPC .. F01N 3/0842; F01N 13/02; F02D 41/0275; F02D 41/1441; F02D 41/0295
USPC .................. 60/273, 274, 285, 286, 295, 301
See application file for complete search history.

(56) References Cited

U.S. PATENT DOCUMENTS 6,467,258 B1 * 10/2002 Jobson ............... B01D 53/9495
60/274
6,732,507 B1 * 5/2004 Stanglmaier ............ F01N 3/035
60/280

(Continued)

FOREIGN PATENT DOCUMENTS

| EP | 1 403 492 A2 | 3/2004 |
|---|---|---|
| JP | A-2008-38890 | 2/2008 |
| WO | 2014016965 A1 | 1/2014 |

*Primary Examiner* — Patrick Maines
(74) *Attorney, Agent, or Firm* — Oliff PLC

(57) ABSTRACT

A three way catalyst and an NO$_x$ storage catalyst are arranged in an engine exhaust passage. In an engine low load operating region, a combustion is performed under a lean air-fuel ratio, and when NO$_x$ should be released from the NO$_x$ storage catalyst, the air-fuel ratio in a combustion chamber is made rich. In an engine medium load operating region, the base air-fuel ratio is made lower as compared with the engine low load operating region, and the air-fuel ratio in the combustion chamber is made rich at a shorter period as compared with the engine low load operating region. When the operating state of the engine is switched from the engine low load operating region to the engine medium load operating region, the air-fuel ratio in the combustion chamber is temporarily made rich, and the degree of richness of the air-fuel ratio at this time is stepwise lowered.

6 Claims, 18 Drawing Sheets

(51) Int. Cl.
*F02D 41/00* (2006.01)
*F01N 3/10* (2006.01)
*F02D 41/02* (2006.01)
*F02D 41/14* (2006.01)
*F01N 3/08* (2006.01)

(52) U.S. Cl.
CPC .. *F01N 2900/08* (2013.01); *F02D 2200/0806* (2013.01); *F02D 2200/0814* (2013.01); *Y02T 10/22* (2013.01)

(56) References Cited

U.S. PATENT DOCUMENTS

| | | | | |
|---|---|---|---|---|
| 6,823,843 B1* | 11/2004 | Goralski, Jr. | G02D 41/0275 | 123/435 |
| 2001/0015066 A1* | 8/2001 | Takaku | F01N 3/0842 | 60/285 |
| 2004/0107694 A1* | 6/2004 | Yoshida | B01D 53/9495 | 60/274 |
| 2004/0123585 A1* | 7/2004 | Yamaguchi | B01D 53/90 | 60/274 |
| 2005/0222748 A1* | 10/2005 | Naik | F02D 41/0275 | 701/103 |
| 2006/0010856 A1* | 1/2006 | Audouin | F02D 41/0245 | 60/285 |
| 2007/0220865 A1* | 9/2007 | Cunningham | F01N 3/0253 | 60/286 |
| 2008/0202098 A1* | 8/2008 | Fisher | F01N 3/0814 | 60/285 |
| 2010/0115926 A1* | 5/2010 | Nagaoka | B01D 53/9495 | 60/286 |
| 2012/0222406 A1* | 9/2012 | Sakurai | F01N 3/0814 | 60/276 |
| 2015/0176458 A1* | 6/2015 | Park | F01N 3/208 | 60/605.2 |
| 2015/0176514 A1 | 6/2015 | Bisaiji et al. | | |
| 2015/0204261 A1* | 7/2015 | Sakurai | F02D 41/1475 | 60/285 |
| 2015/0240733 A1* | 8/2015 | Inoue | F01N 3/101 | 60/285 |

\* cited by examiner

FIG. 1
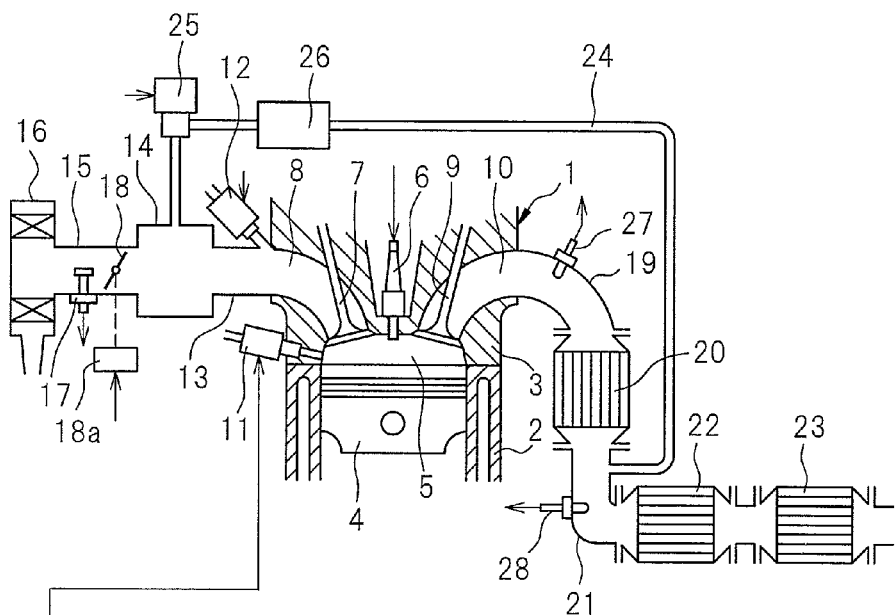
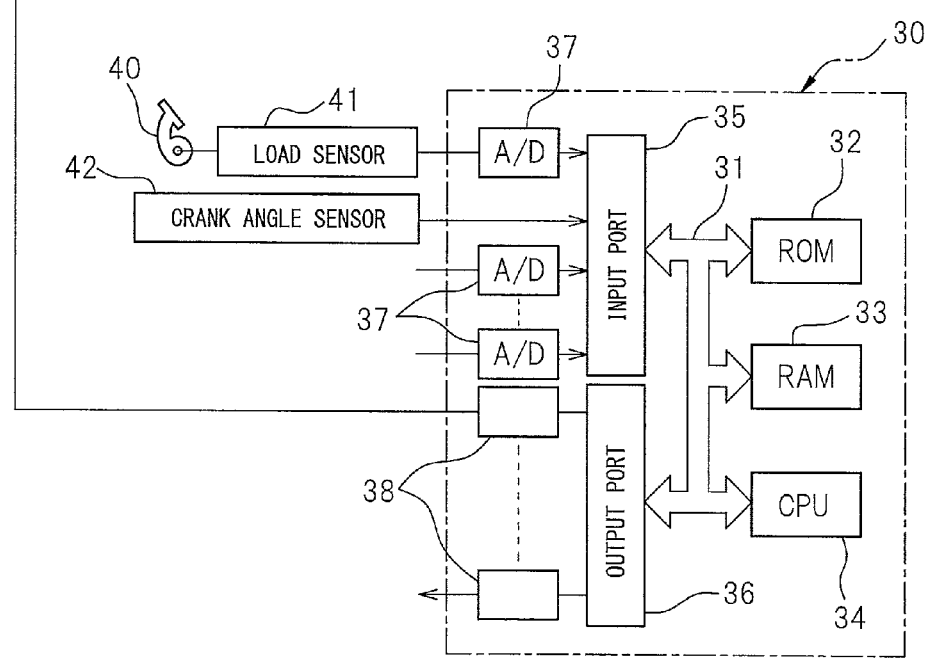

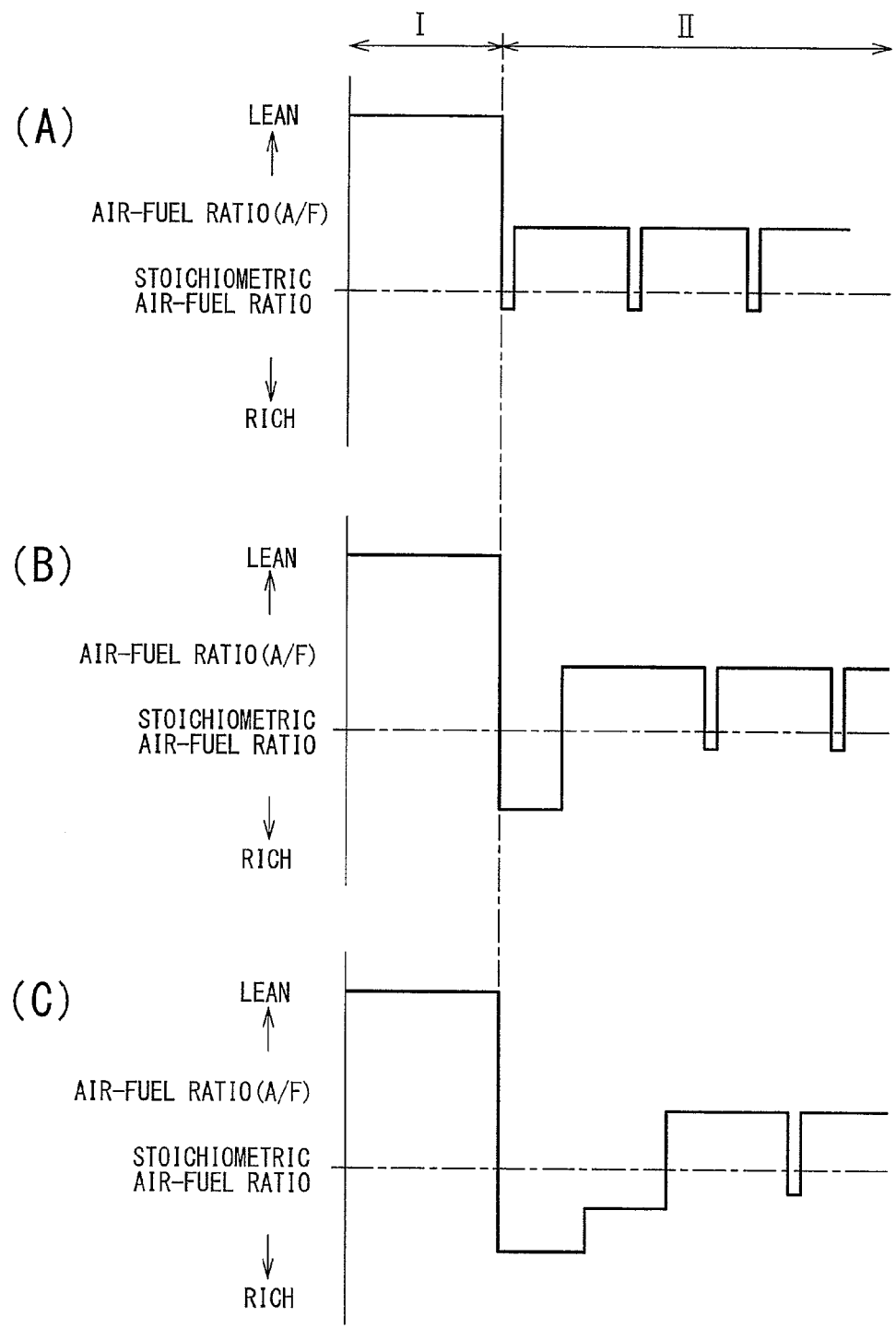

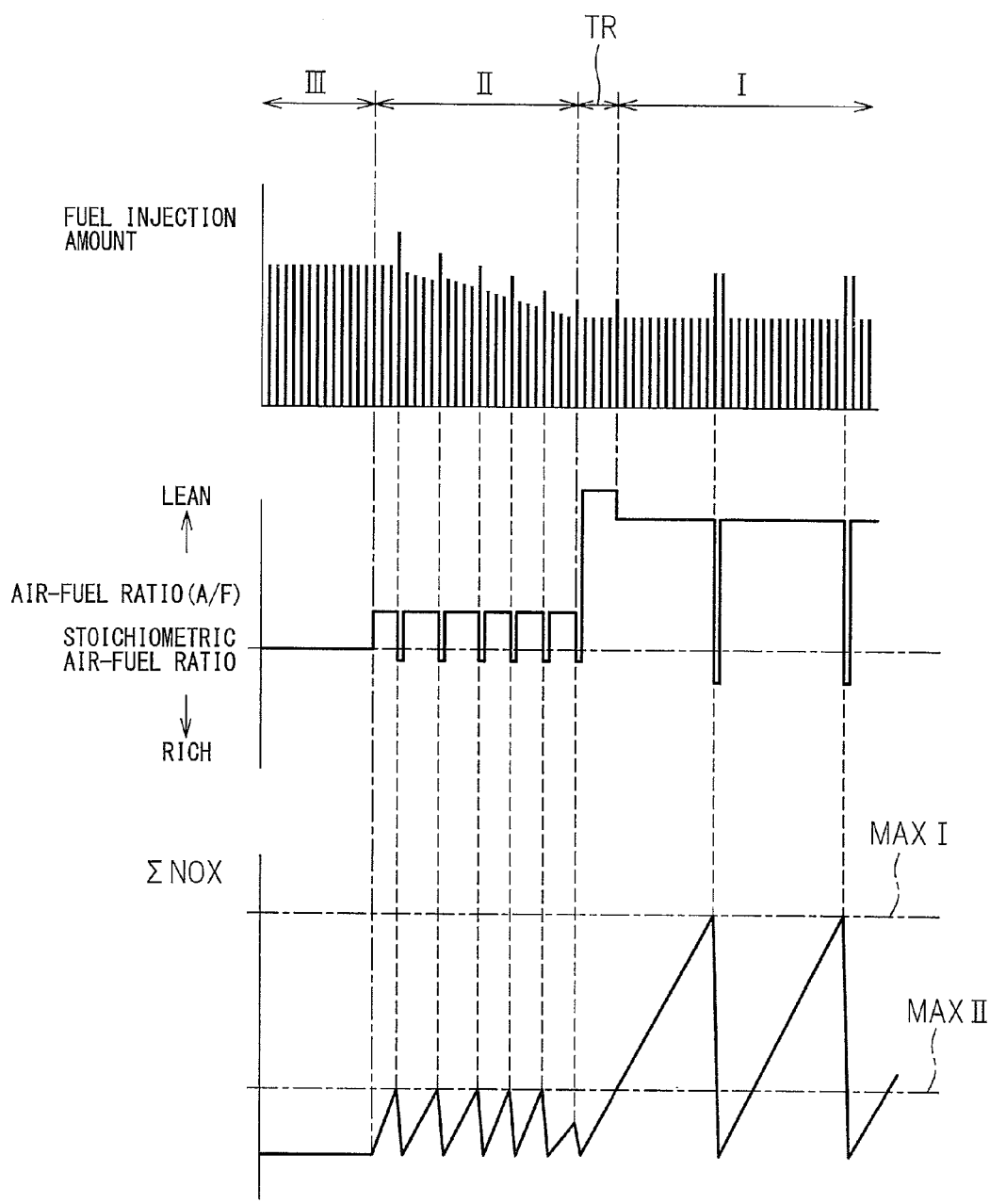

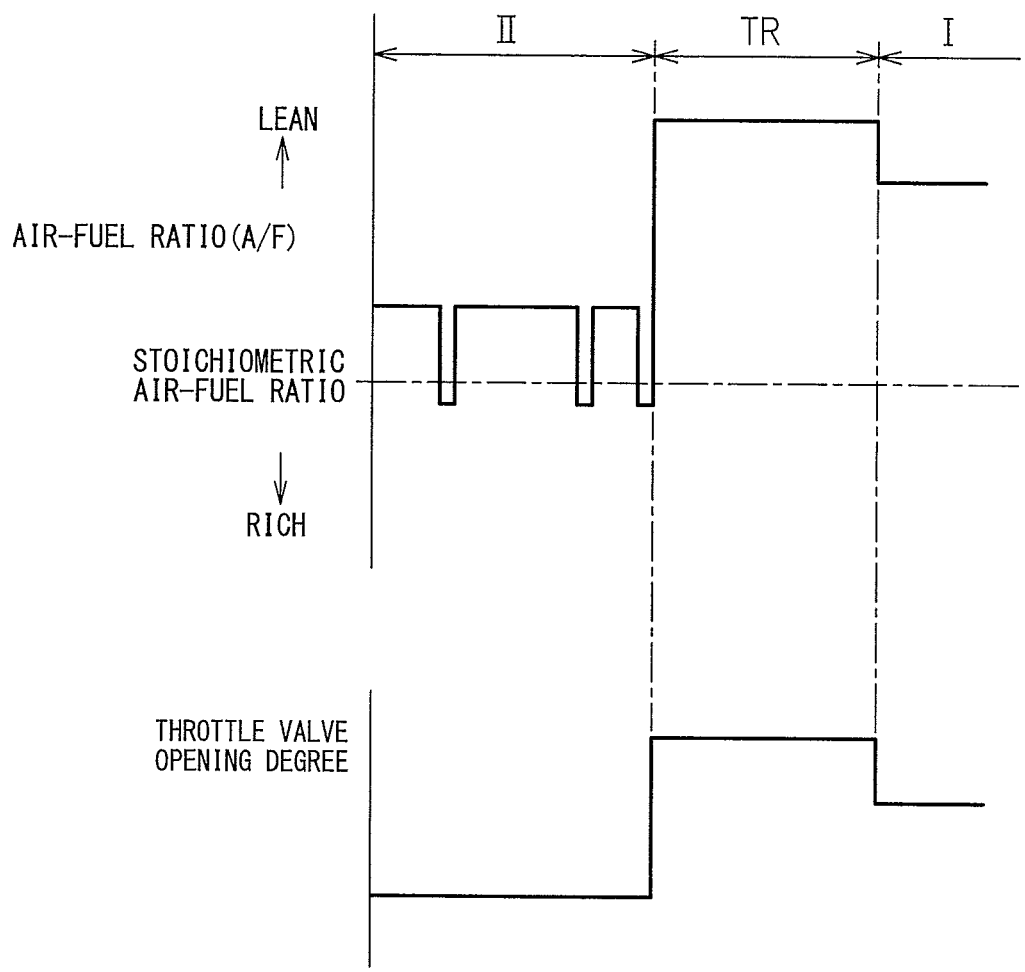
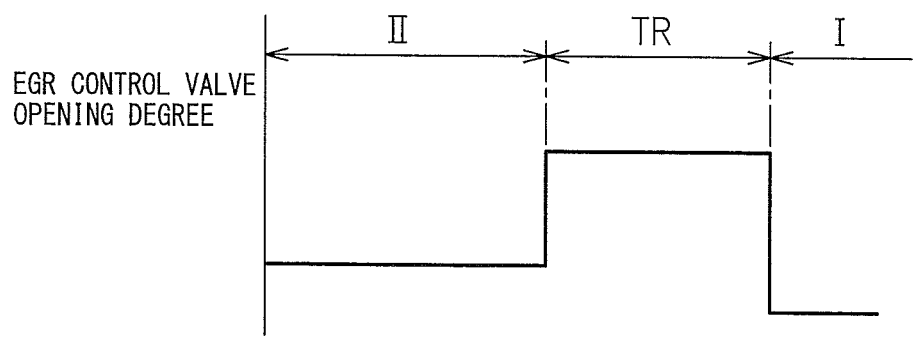

ated in the engine exhaust passage, stores $NO_x$ in exhaust gas when an air-fuel ratio of inflowing exhaust gas
EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, a three-way catalyst, arranges, downstream of the three-way catalyst in the engine exhaust passage, an $NO_x$ storage catalyst which stores $NO_x$ in exhaust gas when the air-fuel ratio of the inflowing exhaust gas is lean and releases the stored $NO_x$ when the air-fuel ratio of the inflowing exhaust gas is made rich, and which switches an engine operating mode in accordance with an engine operating state to either of a lean air-fuel ratio operating mode where the fuel is burned under a lean air-fuel ratio and a stoichiometric air-fuel ratio operating mode where the fuel is burned under a stoichiometric air-fuel ratio (for example, see Patent Literature 1).

In such an internal combustion engine, burning fuel under a lean air-fuel ratio enables a smaller fuel consumption compared with the case of burning fuel under the stoichiometric air-fuel ratio. Therefore, in such an internal combustion engine, usually the fuel is burned under a lean air-fuel ratio in as broad an operating region as possible. However, if burning fuel under a lean air-fuel ratio when the engine load becomes high, the temperature of the $NO_x$ storage catalyst rises and as a result the $NO_x$ storage ability of the $NO_x$ storage catalyst falls, so the $NO_x$ purification rate falls. Therefore, in such an internal combustion engine, to prevent the $NO_x$ purification rate from falling, when the engine load becomes higher, the operating mode is shifted from the lean air-fuel ratio operating mode to the stoichiometric air-fuel ratio operating mode.

CITATIONS LIST

Patent Literature

Patent Literature 1: Japanese Patent Publication No. 2008-38890A

SUMMARY OF INVENTION

Technical Problem

However, in this way, there is the problem that if the operating mode is switched to the stoichiometric air-fuel ratio operating mode and fuel is burned under the stoichiometric air-fuel ratio, the fuel consumption increases.

An object of the present invention is to provide an exhaust purification system of an internal combustion engine which can secure a high $NO_x$ purification rate while reducing the fuel consumption.

Solution to Problem

According to the present invention, there is provided an exhaust purification system of an internal combustion engine comprising a three-way catalyst which is arranged in an engine exhaust passage, an $NO_x$ storage catalyst which is arranged in the engine exhaust passage, stores $NO_x$ in exhaust gas when an air-fuel ratio of inflowing exhaust gas is lean, and releases the stored $NO_x$ when the air-fuel ratio of the inflowing exhaust gas is made rich, and a control device which controls the air-fuel ratio of the exhaust gas which flows into the $NO_x$ storage catalyst, wherein the control device controls the air-fuel ratio so that the engine operating regions include: a low load operating region in which fuel is burned in a combustion chamber by a lean base air-fuel ratio and in which the air-fuel ratio in the combustion chamber is made rich when $NO_x$ should be released from the $NO_x$ storage catalyst; a medium load operating region in which fuel is burned in the combustion chamber by a base air-fuel ratio smaller than the base air-fuel ratio in the engine low load operating region and in which the air-fuel ratio in the combustion chamber is made rich by a period which is shorter than a rich period of the air-fuel ratio for releasing $NO_x$ in the engine low load operating region; and a high load operating region in which the air-fuel ratio in the combustion chamber is feedback controlled to the stoichiometric air-fuel ratio, and the above-mentioned control device further makes the air-fuel ratio in the combustion chamber temporarily rich when the engine operating state shifts from the engine low load operating region to the engine medium load operating region and makes a degree of richness of the air-fuel ratio at this time gradually fall in a state larger than the degree of richness when the air-fuel ratio in the combustion chamber is made rich in the engine medium load operating region.

Advantageous Effects of Invention

By providing an engine medium load operating region which can burn fuel under a lean air-fuel ratio while removing $NO_x$, it is possible to reduce the fuel consumption while securing a high $NO_x$ purification rate. Furthermore, by making the air-fuel ratio in the combustion chamber temporarily rich when the engine operating state is shifted from the engine low load operating region to the engine medium load operating region and making the degree of richness of the air-fuel ratio at this time gradually fall in a state larger than the degree of richness when the air-fuel ratio in the combustion chamber is rich in the engine medium load operating region, it is possible to start a good action of removal of $NO_x$ immediately under a lean air-fuel ratio when the engine operating state shifts from the engine low load operating region to the engine medium load operating region.

BRIEF DESCRIPTION OF DRAWINGS

FIG. 1 is an overall view of a compression ignition type internal combustion engine.

FIG. 18 is a time chart which shows a change in the air-fuel ratio due to a difference in the timing when an engine operating state shifts from an engine low load operating region to an engine medium load operating region.

FIG. 19 is a time chart which shows changes in a fuel injection amount etc. at the time of engine operation.

FIGS. 20A and 20B are time charts for explaining a change in the air-fuel ratio which is shown in FIG. 19 etc.

DESCRIPTION OF EMBODIMENTS

Figure 2:
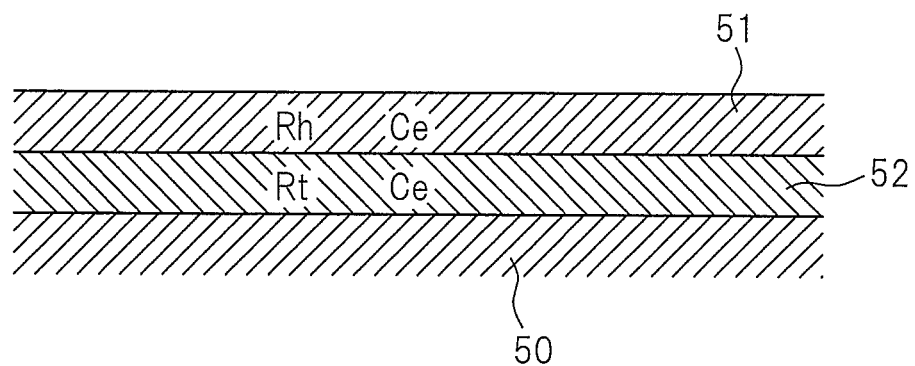
FIG. 2 is a view which schematically shows a surface part of a substrate of a three-way catalyst.

FIG. 1 is an overall view of a spark ignition type internal combustion engine. Referring to FIG. 1, 1 indicates an engine body, 2 a cylinder block, 3 a cylinder head, 4 a piston, 5 a combustion chamber, 6 a spark plug, 7 an intake valve, 8 an intake port, 9 an exhaust valve, and 10 an exhaust port. As shown in FIG. 1, each cylinder is provided with a pair of fuel injectors which are comprised of an electronic control type fuel injector 11 for injecting fuel toward the inside of the combustion chamber 2 and an electronic control type fuel injector 12 for injecting fuel toward the inside of the intake port 8. The intake port 8 of each cylinder is connected through an intake branch pipe 13 to a surge tank 14. The surge tank 14 is connected through an intake duct 15 to an air cleaner 16. Inside of the intake duct 15, an intake air amount detector 17 and a throttle valve 18 which is driven by an actuator 18a are arranged.

On the other hand, the exhaust port 10 of each cylinder is connected through an exhaust manifold 19 to the inlet of a three-way catalyst 20 while the outlet of the three-way catalyst 20 is connected through an exhaust pipe 21 to the inlet of an $NO_x$ storage catalyst 22. The outlet of the $NO_x$ storage catalyst 22 is connected to an $NO_x$ selective reduction catalyst 23. On the other hand, the exhaust pipe 21 and the surge tank 14 are connected through an exhaust gas recirculation (below, called "EGR") passage 24 to each other. Inside of the EGR passage 24, an electronic control type EGR control valve 25 is arranged. Furthermore, a cooling device 26 is arranged around the EGR passage 24 for cooling the exhaust gas which flows through the inside of the EGR passage 24. In the embodiment which is shown in FIG. 1, the engine cooling water is introduced into the cooling device 26 and the engine cooling water is used to cool the exhaust gas.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream of the three-way catalyst 20, an air-fuel ratio sensor 27 is attached for detecting the air-fuel ratio of the exhaust gas which is exhausted from the engine. Downstream of the three-way catalyst 20, an oxygen concentration sensor 28 is attached for detecting the oxygen concentration of the exhaust gas. The output signals of these air-fuel ratio sensor 27, oxygen concentration sensor 28, and intake air amount detector 17 are input through the corresponding AD converters 37 to the input port 35. Further, a load sensor 41 generating an output voltage which is proportional to the amount of depression of an accelerator pedal 40 is connected to the accelerator pedal 40. The output voltage of the load sensor 41 is input through the corresponding AD converter 37 to the input port 35. Furthermore, a crank angle sensor 42 generating an output pulse each time the crank shaft rotates by for example 30° is connected to the input port 35. On the other hand, the output port 36 is connected through the corresponding derive circuits 38 to the spark plugs 6, fuel injectors 11, 12, throttle valve drive actuator 18a, and EGR control valve 25.

FIG. 2 schematically shows the surface part of a substrate of the three-way catalyst 20. As shown in FIG. 2, on the catalyst carrier 50, a top coat layer 51 and a bottom coat layer 52 are formed in a laminated state. The top coat layer 51 is comprised of rhodium Rh and cerium Ce, while the bottom coat layer 52 is comprised of platinum Pt and cerium Ce. Note that, in this case, the amount of cerium Ce which is contained in the top coat layer 51 is smaller than the amount of cerium Ce which is contained in the bottom coat layer 52. Further, the top coat layer 51 can be made to include zirconium Zr in it, while the bottom coat layer 52 can be made to include palladium Pd.

This three-way catalyst 20 has the function of simultaneously reducing the harmful ingredients HC, CO, and $NO_x$ which are contained in exhaust gas when fuel is burned in the combustion chamber 5 under the stoichiometric air-fuel ratio, that is, when the air-fuel ratio of the exhaust gas which is exhausted from the engine is the stoichiometric air-fuel ratio. Therefore, when fuel is burned in the combustion chamber 5 under the stoichiometric air-fuel ratio, the harmful ingredients HC, CO, and $NO_x$ which are contained in the exhaust gas are removed in the three-way catalyst 20.

Note that, it is impossible to continue to hold the air-fuel ratio in the combustion chamber 5 completely at the stoichiometric air-fuel ratio. Therefore, in practice, the amounts of injection from the fuel injectors 11 and 12 are feedback controlled based on the detection signal of the air-fuel ratio sensor 27 so that the air-fuel ratio of the exhaust gas exhausted from the combustion chamber 5 is made to become substantially the stoichiometric air-fuel ratio, that is, the air-fuel ratio of the exhaust gas exhausted from the combustion chamber 5 is made to vibrate about the stoichiometric air-fuel ratio. Further, in this case, when the center of fluctuation of the air-fuel ratio of the exhaust gas is off from the stoichiometric air-fuel ratio, the air-fuel ratio of the exhaust gas is adjusted based on the output signal of the oxygen concentration sensor 28 so that the center of fluctuation of the air-fuel ratio of the exhaust gas returns to the stoichiometric air-fuel ratio. In this way, even if the air-fuel ratio of the exhaust gas exhausted from the combustion chamber 5 vibrates about the stoichiometric air-fuel ratio, the oxygen storage ability of the three-way catalyst 20 due to cerium Ce enables the harmful ingredients HC, CO, and $NO_x$ which are contained in the exhaust gas to be removed well at the three-way catalyst 20.

Figure 3A:
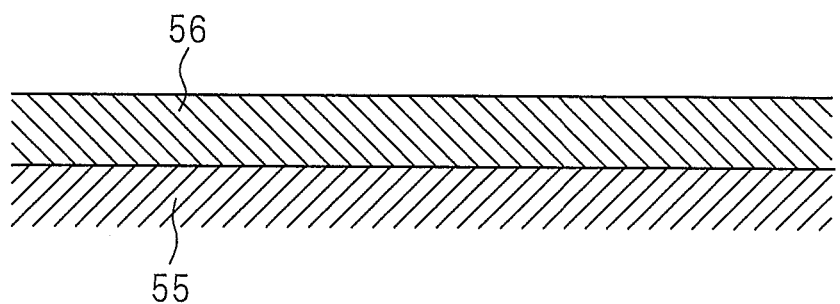
FIGS. 3A and 3B are views schematically showing a surface part etc. of a catalyst carrier of an $NO_x$ storage catalyst.
Figure 3B:
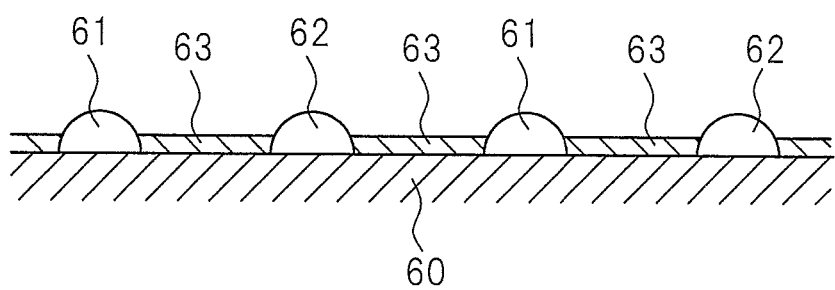

FIG. 3A schematically shows the surface part of the substrate 55 of the $NO_x$ storage catalyst 22. As shown in FIG. 3A, in the $NO_x$ storage catalyst 22 as well, a coat layer 56 is formed on the substrate 55. This coat layer 56 is comprised of for example an aggregate of powder. FIG. 3B shows an enlarged view of this powder. If referring to FIG. 3B, a catalyst carrier 60 which is comprised of this powder, for example, alumina, carries precious metal catalysts 61 and 62. Furthermore, this catalyst carrier 60 is formed with a basicity layer 63 which includes at least one element selected from potassium K, sodium Na, cesium Cs, and other such alkali metals, barium Ba, calcium Ca, and other such alkali earth metals, lanthanoids and other such rare earths and silver Ag, copper Cu, iron Fe, iridium Ir, and other such metals which donate electrons to $NO_x$.

On the other hand, in FIG. 3B, the precious metal catalyst 61 is comprised of platinum Pt, while the precious metal catalyst 62 is comprised of rhodium Rh. Note that in this case, either of the precious metal catalysts 61 and 62 may also be comprised from platinum Pt. Further, the catalyst carrier 60 can carry on it not only platinum Pt and rhodium Rh but also palladium Pd or can carry on it, instead of rhodium Rh, palladium Pd. That is, the precious metal catalysts 61 and 62 which are carried on the catalyst carrier 60 are comprised of at least one of platinum Pt, rhodium Rh, and palladium Pd.

Next, the action of adsorption and release of $NO_x$ by the $NO_x$ storage catalyst 22 will be explained with reference to FIGS. 4A and 4B which are enlarged views of FIG. 3B.

Now, when fuel is burned under a lean air-fuel ratio, that is, when the air-fuel ratio of the exhaust gas is lean, the oxygen concentration of the exhaust gas is high. Therefore, at this time, the NO which is contained in the exhaust gas, as shown in FIG. 4A, is oxidized on the platinum Pt 61 to become $NO_2$. Next, it is absorbed in the basicity layer 63 to diffuse in the form of nitric acid ions $NO_3^-$ inside the basicity layer 63 and become nitrates. In this way, the $NO_x$ in the exhaust gas is absorbed in the form of nitrates in the basicity layer 63. So long as the oxygen concentration of the exhaust gas is high, $NO_2$ is formed on the surface 61 of the platinum Pt. So long as the $NO_x$ absorption ability of the basicity layer 63 is not saturated, the $NO_x$ is absorbed in the basicity layer 63 and nitrates are formed.

Figure 4A:
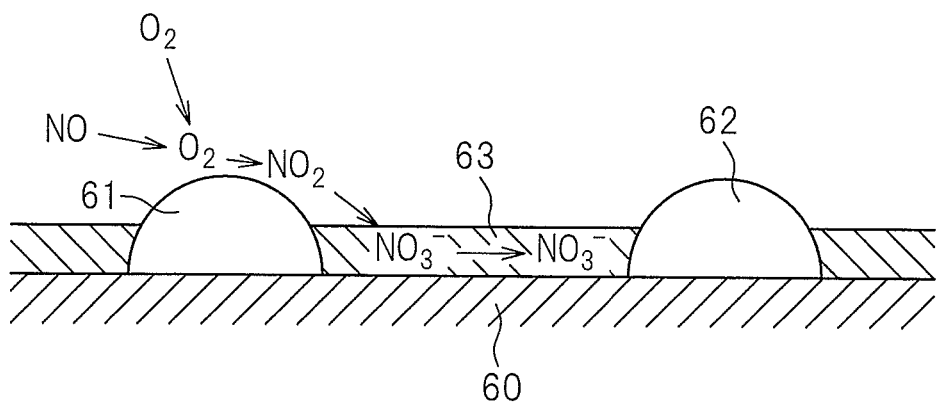
FIGS. 4A and 4B are views for explaining an oxidation reduction reaction in an $NO_x$ storage catalyst.
Figure 4B:
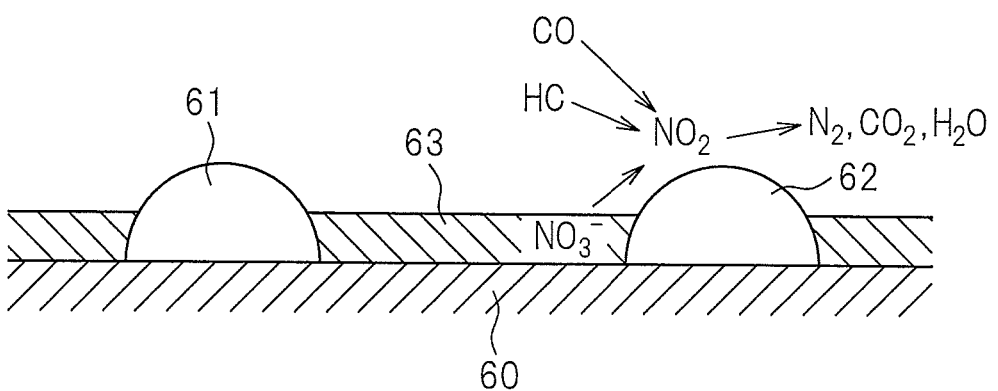

As opposed to this, if the air-fuel ratio in the combustion chamber 5 is made rich, the oxygen concentration of the exhaust gas which flows into the $NO_x$ storage catalyst 22 falls, so the reaction proceeds in the opposite direction ($NO_3^- \rightarrow NO_2$) and therefore nitrates which are absorbed in the basicity layer 63 successively become nitric acid ions $NO_3^-$ and, as shown in FIG. 4B, are released in the form of $NO_2$ from the basicity layer 63. Next, the released $NO_2$ is reduced by the hydrocarbons HC and CO which are contained in the exhaust gas.

Note that, when fuel is burned in a lean air-fuel ratio, that is, when the air-fuel ratio of the exhaust gas is lean, NO is adsorbed at the surface 61 of the platinum Pt. Therefore, the NO in the exhaust gas is held at the $NO_x$ storage catalyst 22 by this adsorption action as well. The NO which is adsorbed at the surface 61 of the platinum Pt is desorbed from the surface 61 of the platinum PT if air-fuel ratio in the combustion chamber 5 is made rich. Therefore, if using the term "storage" as the term including both absorption and adsorption, the basicity layer 63 plays the role of an $NO_x$ storage agent for temporarily storing the $NO_x$. Therefore, if referring to the ratio of the air and fuel (hydrocarbons) which are fed into the engine intake passage, combustion chambers 5, and exhaust passage upstream of the $NO_x$ storage catalyst 22 is referred to as the "air-fuel ratio of the exhaust gas", the $NO_x$ storage catalyst 22 stores $NO_x$ when the air-fuel ratio of the exhaust gas which flows into the $NO_x$ storage catalyst 22 is lean and releases the stored $NO_x$ when the air-fuel ratio of the exhaust gas which flows into the $NO_x$ storage catalyst 22 becomes rich.

When the air-fuel ratio of the exhaust gas is lean in this way, that is, when the fuel is burned under a lean air-fuel ratio, the $NO_x$ in the exhaust gas is stored in the $NO_x$ storage catalyst 22. However, if fuel continues to be burned under a lean air-fuel ratio, during that time, the $NO_x$ storage ability of the $NO_x$ storage catalyst 22 will end up being saturated. As a result, the $NO_x$ storage catalyst 22 will no longer be able to store $NO_x$. Therefore, before the $NO_x$ storage catalyst 22 becomes saturated in $NO_x$ storage ability, the air-fuel ratio in the combustion chamber 5 is made temporarily rich and thereby the $NO_x$ storage catalyst 22 is made to release $NO_x$.

Figure 5:
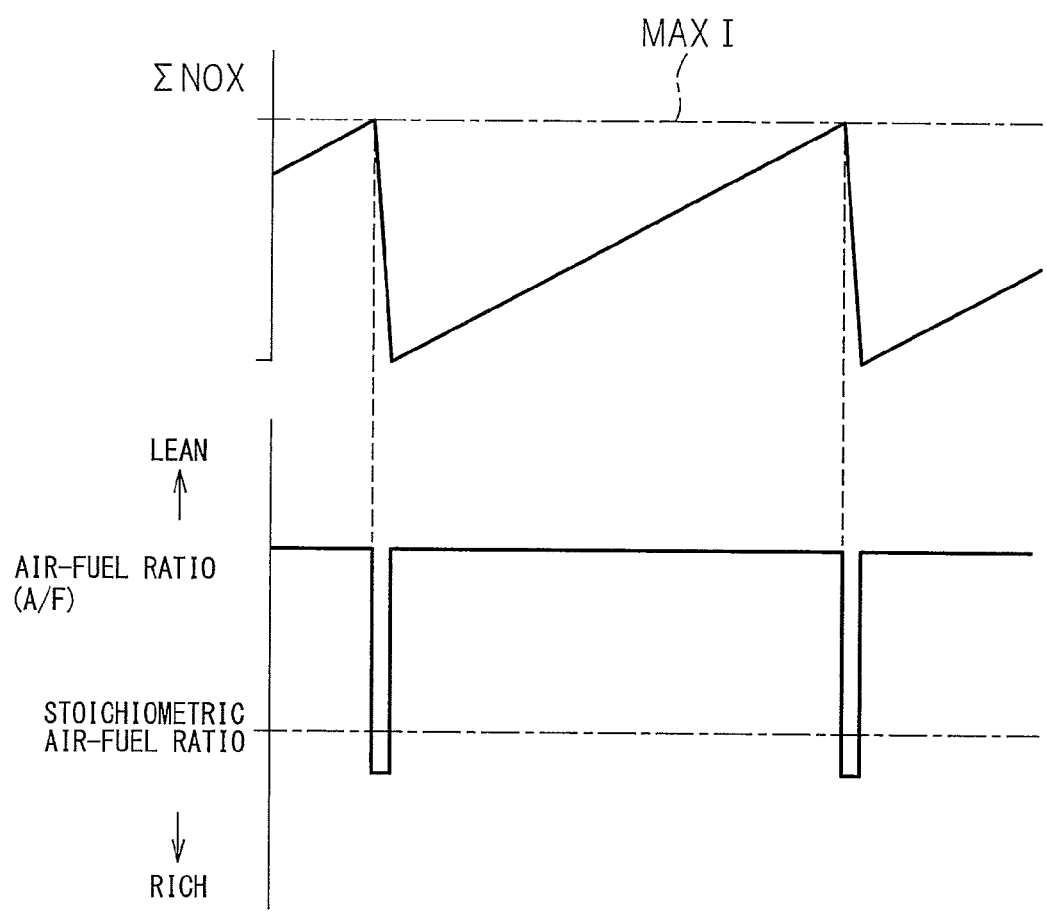
FIG. 5 is a view which shows $NO_x$ release control.

FIG. 5 shows the control for release of $NO_x$ from the $NO_x$ storage catalyst 22 which is used in the embodiment according to the present invention. If referring to FIG. 5, in this embodiment according to the present invention, the air-fuel ratio (A/F) in the combustion chamber 5 is temporarily made rich when the stored $NO_x$ amount $\Sigma NOX$ which is stored in the $NO_x$ storage catalyst 22 exceeds the predetermined first allowable $NO_x$ storage amount MAXI. If the air-fuel ratio (A/F) in the combustion chamber 5 is made rich, that is, if the air-fuel ratio of the exhaust gas which flows into the $NO_x$ storage catalyst 22 is made rich, the $NO_x$ which was stored in the $NO_x$ storage catalyst 22 when the fuel was burned under a lean air-fuel ratio, is released all at once from the $NO_x$ storage catalyst 22 and reduced. Due to this, the $NO_x$ is removed.

Figure 6:
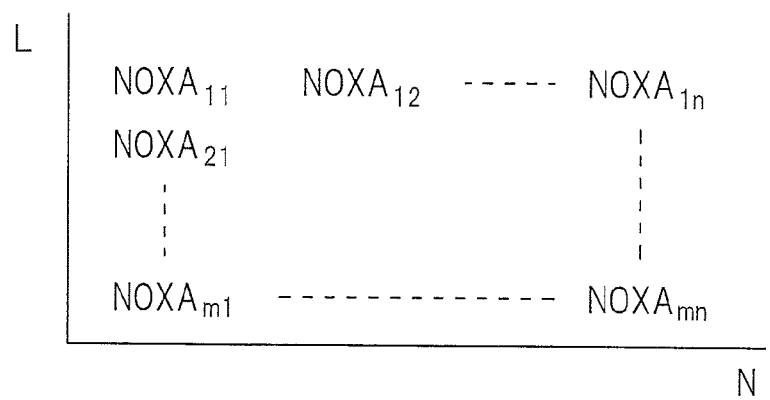
FIG. 6 is a view which shows a map of an exhausted $NO_x$ amount NOXA.

The stored $NO_x$ amount $\Sigma NOX$ is for example calculated from the amount of $NO_x$ which is exhausted from the engine. In this embodiment according to the present invention, the exhausted $NO_x$ amount NOXA which is exhausted from the engine per unit time is stored as a function of the demanded load L and engine speed N in the form of a map such as shown in FIG. 6 in advance in the ROM 32. From this exhausted $NO_x$ amount NOXA, the stored $NO_x$ amount $\Sigma NOX$ is calculated. In this case, the period by which the air-fuel ratio in the combustion chamber 5 is made rich is usually 1 minute or more.

Figure 7:
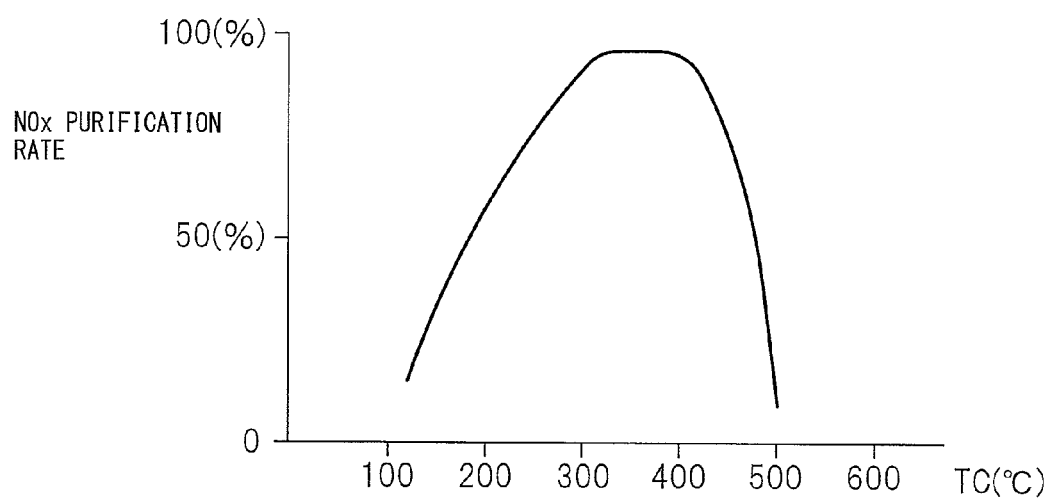
FIG. 7 is a view showing an $NO_x$ purification rate.

FIG. 7 shows the $NO_x$ purification rate when using the $NO_x$ storage and release action of the $NO_x$ storage catalyst 22 such as shown in FIG. 5 so as to remove the $NO_x$. Note that, in FIG. 7, the abscissa shows the catalyst temperature TC of the $NO_x$ storage catalyst 22. In this case, as will be understood from FIG. 7, when the catalyst temperature TC is 300° C. to 400° C., an extremely high $NO_x$ purification rate is obtained, but if the catalyst temperature TC becomes a 400° C. or higher temperature, the $NO_x$ purification rate falls. If the catalyst temperature TC becomes 400° C. or more in this way, the $NO_x$ purification rate falls since if the catalyst temperature TC becomes 400° C. or more, $NO_x$ becomes harder to store and, further, the nitrates break down under heat and are released in the form of $NO_2$ from the $NO_x$ storage catalyst 22. That is, so long as storing $NO_x$ in the form of nitrates, obtaining a high $NO_x$ purification rate is difficult when the catalyst temperature TC is high.

Now then, when fuel is burned under a lean air-fuel ratio, the fuel consumption becomes smaller compared with when fuel is burned under the stoichiometric air-fuel ratio. Therefore, to reduce the fuel consumption, as much as possible, it is preferable to burn fuel under a lean air-fuel ratio. However, as will be understood from FIG. 7, if the temperature TC of the $NO_x$ storage catalyst 22 becomes higher, the $NO_x$ purification rate falls. As opposed to this, when fuel is burned under the stoichiometric air-fuel ratio, even if the temperature TC of the three-way catalyst 20 becomes high, the $NO_x$ purification rate does not fall. Therefore, conventionally, fuel is burned under a lean air-fuel ratio at the time of engine low load operation where the temperature TC of the $NO_x$ storage catalyst 22 is low, and fuel is burned under the stoichiometric air-fuel ratio at the time of engine high load operation where the temperature TC of the $NO_x$ storage catalyst 22 becomes higher.

Now then, under such circumstances, the inventors focused on the NO adsorption action in their studies and as a result discovered a new $NO_x$ removal method which enables a high $NO_x$ purification rate to be obtained even if burning the fuel under a lean air-fuel ratio when the temperature TC of the $NO_x$ storage catalyst 22 is high. That is, in the past, it has been known that an $NO_x$ storage catalyst 22 adsorbs NO. However, the behavior of the adsorbed NO has not been pursued that much at all up to now. Therefore, the inventors pursued the behavior of the adsorbed NO and found out that if utilizing the adsorption characteristics of this adsorbed NO, it is possible to secure a high $NO_x$ purification rate even if burning fuel under a lean air-fuel ratio when the temperature TC of the $NO_x$ storage catalyst 22 is high. This new $NO_x$ removal method utilizes the NO adsorption action, so below this new $NO_x$ removal method will be referred to as an "$NO_x$ removal method utilizing adsorbed NO". Therefore, first, to start with, this $NO_x$ removal method utilizing adsorbed NO will be explained while referring to FIG. 8A to FIG. 13.

Figure 8A:
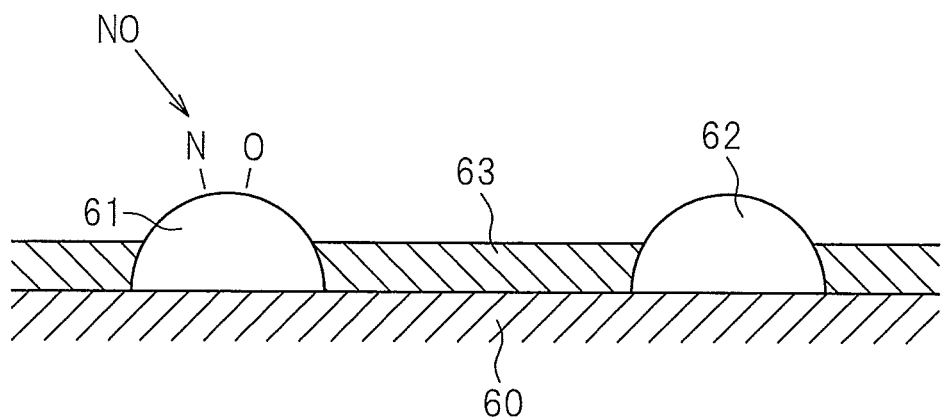
FIGS. 8A and 8B are views for explaining an oxidation reduction reaction in an $NO_x$ storage catalyst.
Figure 8B:
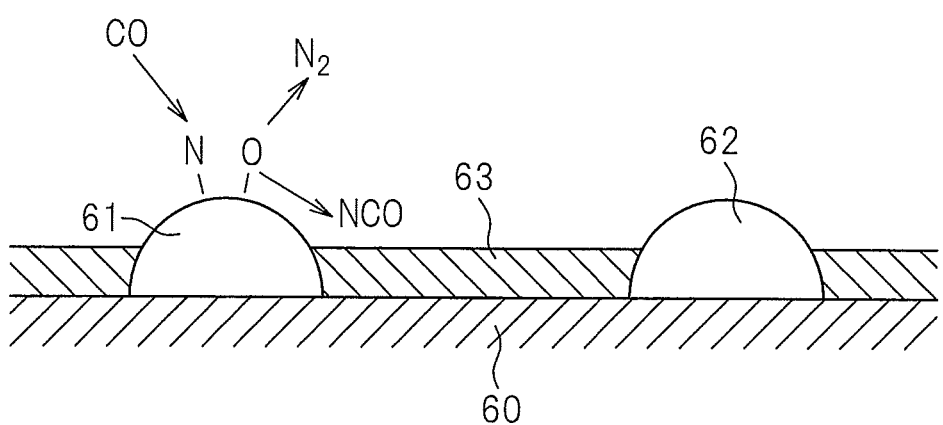

FIGS. 8A and 8B are enlarged views of FIG. 3B, that is, show surface parts of the catalyst carrier 60 of the $NO_x$ storage catalyst 22. Further, FIG. 8A shows the time when fuel is burned under a lean air-fuel ratio, while FIG. 8B shows the time when the air-fuel ratio in the combustion chamber 5 is made rich. When fuel is burned under a lean air-fuel ratio, that is, when the air-fuel ratio of the exhaust gas is lean, as explained above, the $NO_x$ which is contained in the exhaust gas is absorbed at the basicity layer 63, but part of the NO which is contained in the exhaust gas, as shown in FIG. 8A, disassociates and is adsorbed at the surface 61 of the platinum Pt. This amount of adsorption of NO on the surface 61 of the platinum Pt increases together with the elapse of time. Therefore, along with the elapse of time, the amount of adsorption of NO at the $NO_x$ storage catalyst 22 increases.

On the other hand, if the air-fuel ratio in the combustion chamber 5 is made rich, a large amount of carbon monoxide CO is exhausted from the combustion chamber 5. Therefore, the exhaust gas which flows into the $NO_x$ storage catalyst 22 contains a large amount of carbon monoxide CO. This carbon monoxide CO, as shown in FIG. 8B, reacts with the NO which disassociates and is adsorbed at the surface 61 of the platinum Pt. This NO on the one hand becomes $N_2$ and on the other hand becomes the reducing intermediate NCO. This reducing intermediate NCO continues to be held or adsorbed on the surface of the basicity layer 63 for a while after being produced. Therefore, the amount of the reducing intermediate NCO on the basicity layer 63 gradually increases along with the elapse of time. This reducing intermediate NCO reacts with the $NO_x$ which is contained in the exhaust gas whereby the $NO_x$ which is contained in the exhaust gas is removed.

In this way, when fuel is burned under a lean air-fuel ratio, that is, when the air-fuel ratio of the exhaust gas is lean, on the one hand, as shown in FIG. 4A, the $NO_x$ which is contained in the exhaust gas is absorbed at the $NO_x$ storage catalyst 22 and on the other hand, as shown in FIG. 8A, the NO which is contained in the exhaust gas is adsorbed at the $NO_x$ storage catalyst 22. That is, at this time, the $NO_x$ which is contained in the exhaust gas is stored in the $NO_x$ storage catalyst 22. As opposed to this, if the air-fuel ratio in the combustion chamber 5 is made rich, the $NO_x$ which had been absorbed or adsorbed at the $NO_x$ storage catalyst 22, that is, the $NO_x$ which had been stored at the $NO_x$ storage catalyst 22, is released from the $NO_x$ storage catalyst 22.

Figure 9A:
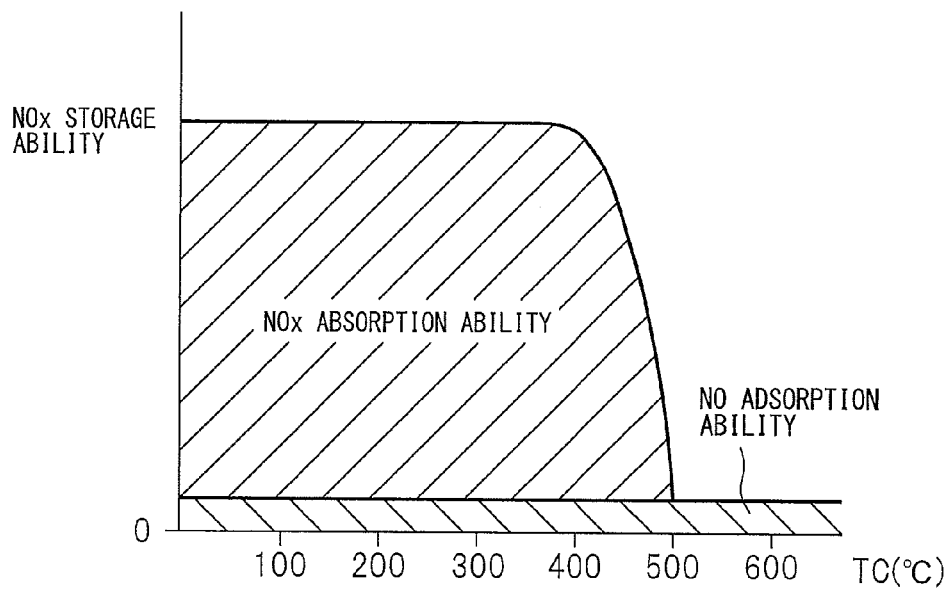
FIGS. 9A and 9Ba are views for explaining an $NO_x$ absorption ability and NO adsorption ability.

FIG. 9A shows the $NO_x$ absorption ability and the NO adsorption ability in case where $NO_x$ is removed by using the $NO_x$ storage and release action of the $NO_x$ storage catalyst 22 as shown in FIG. 5. Note that, in FIG. 9A, the ordinate shows the sum of the $NO_x$ absorption ability and NO adsorption ability, that is, the $NO_x$ storage ability, while the abscissa shows the temperature TC of the $NO_x$ storage catalyst 22. As will be understood from FIG. 9A, when the temperature TC of the $NO_x$ storage catalyst 22 is lower than about 400° C., regardless of the temperature TC of the $NO_x$ storage catalyst 22, the $NO_x$ absorption ability and NO adsorption ability are constant. Therefore, the sum of the $NO_x$ absorption ability and the NO adsorption ability, that is, the $NO_x$ storage ability, also becomes constant regardless of the temperature TC of the $NO_x$ storage catalyst 22.

On the other hand, if the temperature TC of the $NO_x$ storage catalyst 22 becomes higher, the $NO_x$ oxidation reaction (NO→$NO_2$) on the surface 61 of the platinum Pt becomes faster. However, if the temperature TC of the $NO_x$ storage catalyst 22 becomes higher, the reaction by which $NO_2$ becomes nitric acid ions $NO_3^-$ ($NO_2$+$Ba(CO_3)_2$→$Ba(NO_3)_2$+$CO_2$) becomes slower and, as a result, $NO_x$ becomes harder to store at the $NO_x$ storage catalyst 22. Further, if the temperature TC of the $NO_x$ storage catalyst 22 becomes higher, the nitrates break down due to heat and are discharged in the form of $NO_2$ from the $NO_x$ storage catalyst 22. Therefore, as shown in FIG. 9A, if the temperature TC of the $NO_x$ storage catalyst 22 becomes higher and reaches a 400° C. or more high temperature, the $NO_x$ absorption ability rapidly falls. As opposed to this, the amount of adsorption of NO at the surface 61 of the platinum Pt is not affected much at all by the temperature TC of the $NO_x$ storage catalyst 22. Therefore, as shown in FIG. 9A, the NO adsorption ability does not change much at all even if the temperature TC of the $NO_x$ storage catalyst 22 rises.

Next, while referring to FIGS. 10A and 10B, the relationship between the oxygen concentration of the exhaust gas, the NO adsorption ability, and the $NO_x$ absorption ability when fuel is burned under a lean air-fuel ratio will be explained. First, if considering the adsorption at the surface 61 of the platinum Pt, NO and $O_2$ are adsorbed on the surface 61 of the platinum Pt in a competing manner. That is, the larger the amount of NO which is contained in the exhaust gas compared with the amount of $O_2$, the greater the amount of NO which is adsorbed at the surface 61 of the platinum Pt compared with the amount of $O_2$. Conversely, the greater the amount of $O_2$ which is contained in the exhaust gas compared with the amount of $NO_x$ the smaller the amount of NO which is adsorbed at the surface 61 of the platinum Pt compared with the amount of $O_2$. Therefore, the NO adsorption ability at the $NO_x$ storage catalyst 22, as shown in FIG. 10A, falls the higher the oxygen concentration of the exhaust gas.

On the other hand, the higher the oxygen concentration of the exhaust gas, the more the oxidation action of the NO in the exhaust gas is promoted and the more the absorption of $NO_x$ in the $NO_x$ storage catalyst 22 is promoted. Therefore, as shown in FIG. 10B, the higher the $NO_x$ absorption ability in the $NO_x$ storage catalyst 22, the higher the oxygen concentration of the exhaust gas. Note that, in FIGS. 10A and 10B, the region X shows the time when fuel is burned under a lean air-fuel ratio in case where $NO_x$ is removed by utilizing the $NO_x$ storage and release action of the $NO_x$ storage catalyst 22 as shown in FIG. 5. At this time, it is learned that the NO adsorption ability is low and the $NO_x$ absorption ability is high. The above-mentioned FIG. 9A shows the NO adsorption ability and the $NO_x$ absorption ability at this time.

Now then, as already explained with reference to FIG. 9A, if the temperature TC of the $NO_x$ storage catalyst 22 becomes higher and reaches a 400° C. or more high temperature, the $NO_x$ absorption ability rapidly falls. As opposed to this, the NO adsorption ability does not change much at all even if the temperature TC of the $NO_x$ storage catalyst 22 becomes high. Therefore, when the temperature TC of the $NO_x$ storage catalyst 22 becomes high and reaches a 400° C. or more high temperature, if ceasing use of the $NO_x$ removal method utilizing the $NO_x$ absorption action and instead using the $NO_x$ removal method utilizing the NO adsorption action, it is guessed that $NO_x$ may be able to be removed. However, as will be understood from FIG. 9A, the NO adsorption ability is low. To utilize the NO adsorption action to remove the $NO_x$ without inviting an increase in the fuel consumption, the NO adsorption ability has to be increased.

Figure 9B:
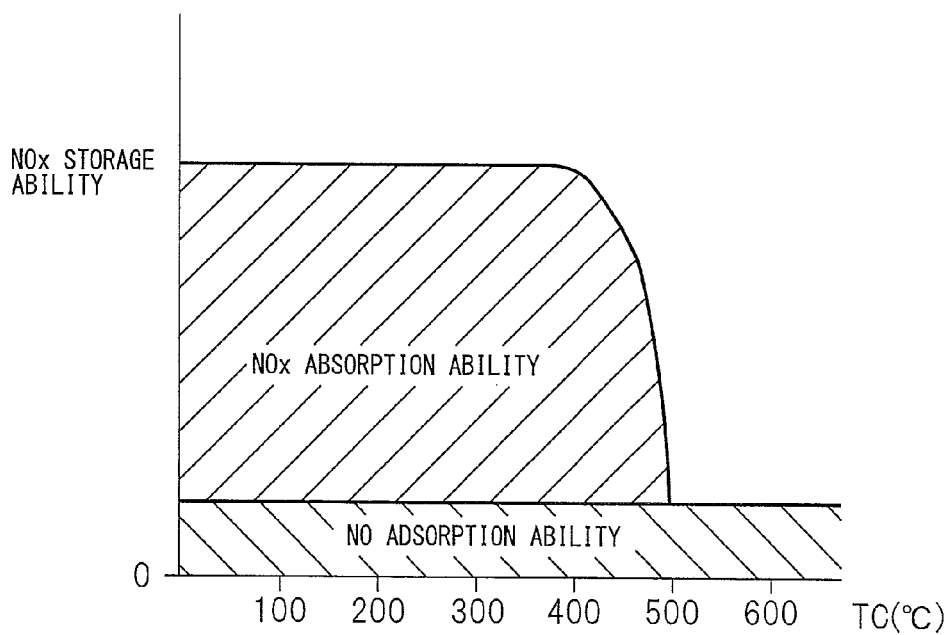
Figure 10A:
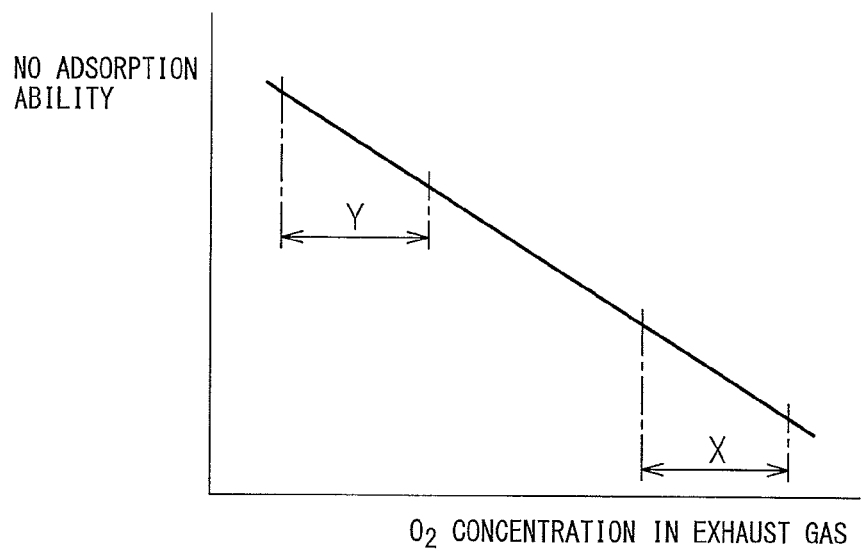
FIGS. 10A and 10B are views for explaining an $NO_x$ absorption ability and NO adsorption ability.
Figure 10B:
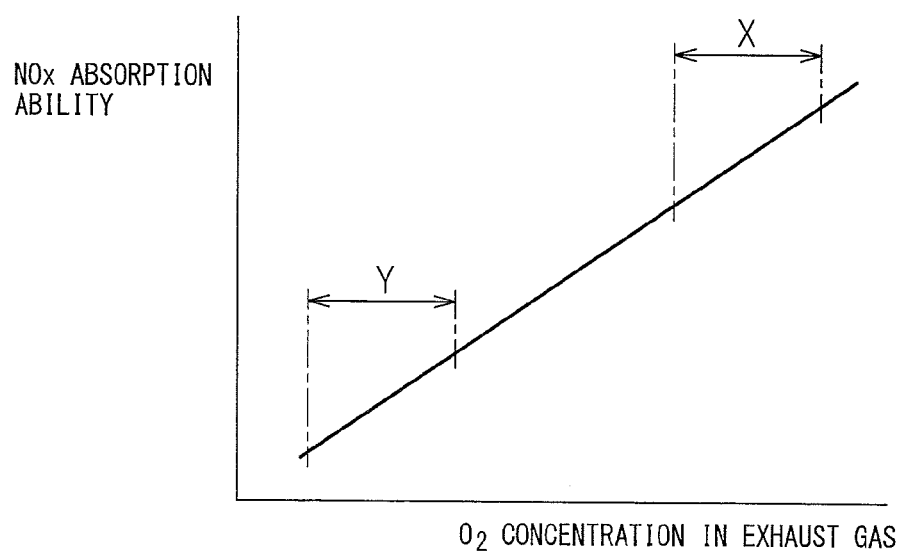

In this case, to make the NO adsorption ability increase, as will be understood from FIG. 10A, it is sufficient to cause the oxygen concentration of the exhaust gas to fall. At this time, as shown in FIG. 10B, the $NO_x$ absorption ability falls. The $NO_x$ absorption ability and NO adsorption ability when making the oxygen concentration of the exhaust gas fall to the region Y in FIGS. 10A and 10B are shown in FIG. 9B. By making the oxygen concentration of the exhaust gas fall, the NO adsorption ability can be made to increase. "Making the oxygen concentration of the exhaust gas fall" means making the air-fuel ratio when fuel is burned under a lean air-fuel ratio (called the "base air-fuel ratio") fall. Therefore, by making the base air-fuel ratio fall, the NO adsorption ability can be made to increase.

Figure 11A:
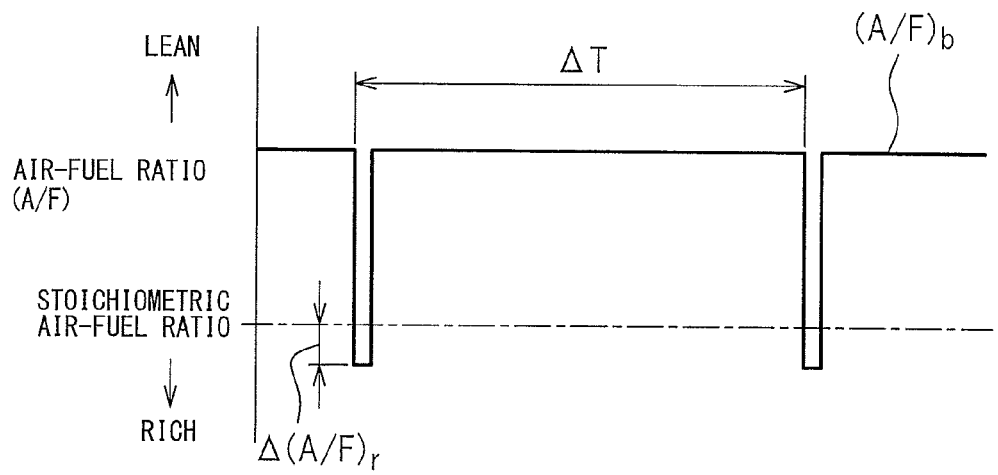
FIGS. 11A, 11B, and 11C are time charts which show changes of an air-fuel ratio of exhaust gas which is exhausted from an engine.
Figure 11B:
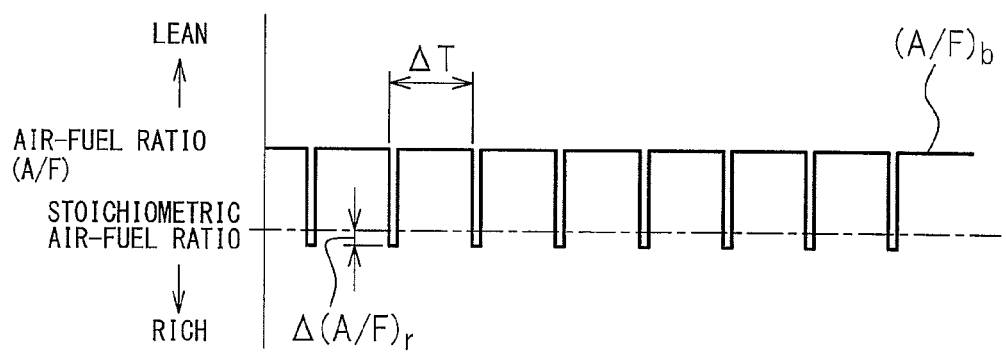

Therefore, in the present invention, when utilizing the NO adsorption action to remove the $NO_x$, that is, in the $NO_x$ removal method utilizing adsorbed NO, the base air-fuel ratio is made to fall. Next, this will be explained with reference to FIG. 11A to FIG. 11C. FIG. 11A shows the change in the air-fuel ratio (A/F) in the combustion chamber 5 in case where $NO_x$ is removed by utilizing the $NO_x$ storage and release action of the $NO_x$ storage catalyst 22 in the same way as the case which is shown in FIG. 5. Note that, in FIG. 11A, (A/F)b shows the base air-fuel ratio, Δ(A/F)r shows the richness degree of the air-fuel ratio, and ΔT shows the rich period of the air-fuel ratio. On the other hand, FIG. 11B shows the change in the air-fuel ratio (A/F) in the combustion chamber 5 in case where $NO_x$ is removed by utilizing the NO adsorption action. Note that, in FIG. 11B, (A/F)b shows the base air-fuel ratio, Δ(A/F)r shows the richness degree of the air-fuel ratio, and ΔT shows the rich period of the air-fuel ratio.

Figure 11C:
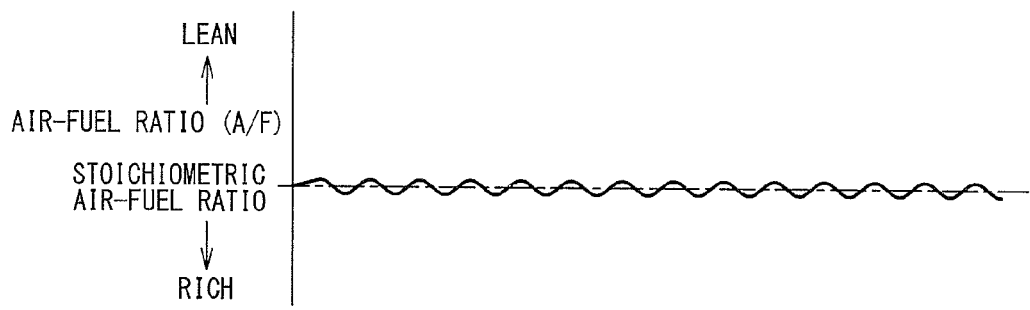

As will be understood if comparing FIG. 11A and FIG. 11B, when utilizing the NO adsorption action to remove $NO_x$ as shown in FIG. 11B, fuel is burned in the combustion chamber 5 under a base air-fuel ratio (A/F) which is smaller than the base air-fuel ratio (A/F)b in the case of utilizing the $NO_x$ storage and release action of the $NO_x$ storage catalyst 22 to remove the $NO_x$ as shown in FIG. 11A and, the air-fuel ratio in the combustion chamber 5 is made rich by a period which is shorter than the rich period ΔT of the air-fuel ratio for release of $NO_x$ in the case of utilizing the $NO_x$ storage and release action of the $NO_x$ storage catalyst 22 to remove the $NO_x$ as shown in FIG. 11A. On the other hand, FIG. 11C shows the change in the air-fuel ratio in the combustion chamber 5 in case where the air-fuel ratio in the combustion chamber 5 is feedback controlled to the stoichiometric air-fuel ratio.

Figure 12:
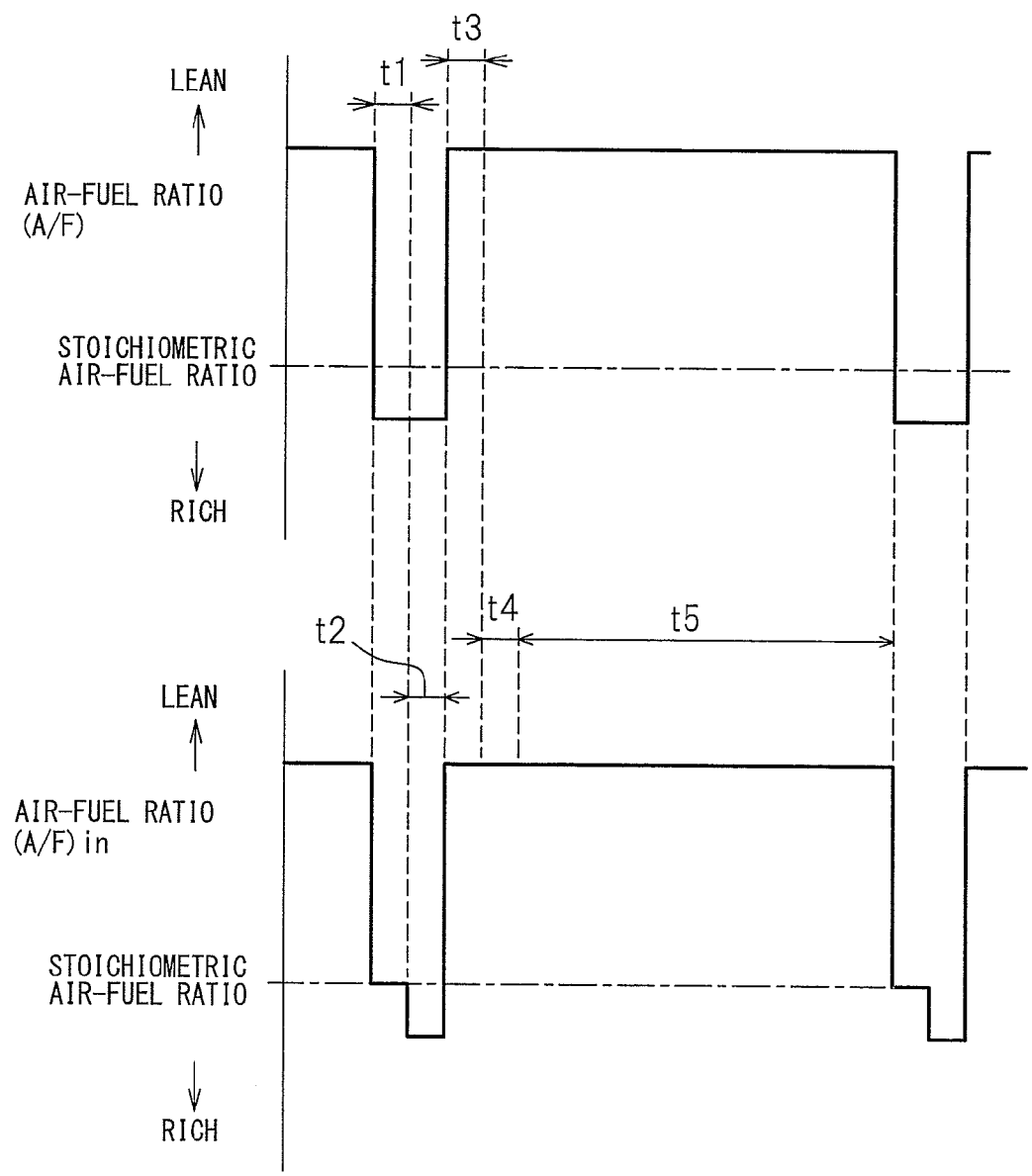
FIG. 12 is a time chart which shows a change of an air-fuel ratio of exhaust gas which flows into a three-way catalyst and $NO_x$ storage catalyst.

FIG. 12 shows the change in the air-fuel ratio (A/F) in the combustion chamber 5 and the change in the air-fuel ratio of the exhaust gas (A/F) in which flows into the $NO_x$ storage catalyst 22 in the case of utilizing the NO adsorption action to remove $NO_x$ as shown in FIG. 11B. In this case, if the air-fuel ratio (A/F) in the combustion chamber 5 is made rich, in the three-way catalyst 20, the stored oxygen is released and the air-fuel ratio is maintained at the stoichiometric air-fuel ratio for the time t1. Due to this, HC, CO, and $NO_x$ are simultaneously reduced. During this time, as shown in FIG. 12, the air-fuel ratio of the exhaust gas (A/F) in which flows into the $NO_x$ storage catalyst 22 is maintained at the stoichiometric air-fuel ratio. Next, if the stored oxygen of the three-way catalyst 20 is consumed, the air-fuel ratio of the inflowing exhaust gas (A/F) in which flows into $NO_x$ storage catalyst 22 becomes rich for the time t2. At this time, as shown in FIG. 8B, the NO which disassociates and is adsorbed on the surface 61 of the platinum Pt on the one hand becomes $N_2$ and on the other hand becomes the reducing intermediate NCO. This reducing intermediate NCO continues to be held or adsorbed on the surface of the basicity layer 63 for a while after being formed.

Next, if the air-fuel ratio (A/F) in the combustion chamber 5 is again returned to the lean state, this time oxygen is stored in the three-way catalyst 20. At this time, at the catalyst surface of the three-way catalyst 20, the air-fuel ratio is maintained at the stoichiometric air-fuel ratio for the time t3. Due to this, at this time as well, HC, CO, and $NO_x$ are simultaneously decreased. Next, during the time t4, the $NO_x$ which is contained in the exhaust gas reacts with the reducing intermediate NCO which is held or adsorbed on the surface of the basicity layer 63 and is reduced by the reducing intermediate NCO. Next, for the time t5, the NO which is contained in the exhaust gas is disassociated and adsorbed at the surface 61 of the platinum Pt as shown in FIG. 8A.

Figure 13:
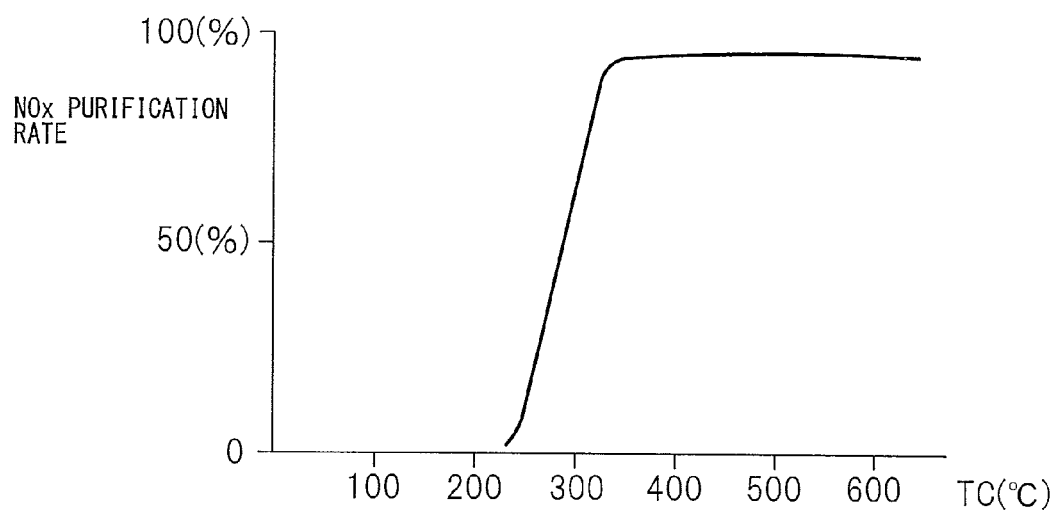
FIG. 13 is a view showing an $NO_x$ purification rate.

In this way, when utilizing the NO adsorption action to remove $NO_x$ as shown in FIG. 11B, two removal actions are performed: the action of removal of $NO_x$ by utilizing the NO adsorption action and the action of removal of $NO_x$ by utilizing the oxygen storage ability at the three-way catalyst 20. The $NO_x$ purification rate at this time is shown in FIG. 13. As shown in FIG. 13, in this case, it is learned that even if the temperature TC of the $NO_x$ storage catalyst 22 becomes higher and reaches a 400° C. or more high temperature, the $NO_x$ purification rate does not fall.

Figure 14:
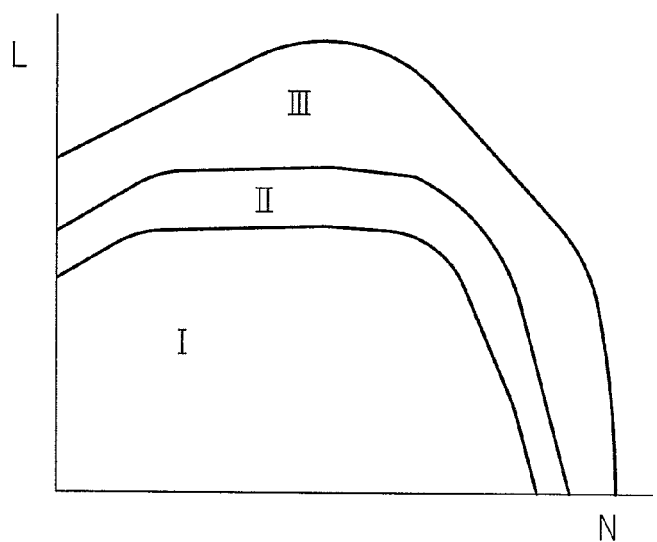
FIG. 14 is a view which shows engine operating regions.

Next, a summary of the engine operating control will be explained. In the embodiment according to the present invention, as shown in FIG. 14, an engine low load operating region I at the engine low load operating side, an engine high load operating region III at the engine high load operating side, and an engine medium load operating region II which is positioned between the engine low load operating region I and the engine high load operating region III are set in advance. Note that, in FIG. 14, the ordinate L shows the required load, while the abscissa N shows the engine speed. In this case, in the engine low load operating region I, as shown in FIG. 11A, an $NO_x$ removal action designed to utilize the $NO_x$ storage and release action of the $NO_x$ storage catalyst 22 to remove the $NO_x$ is performed, while in the engine medium load operating region II, as shown in FIG. 11B, an $NO_x$ removal action designed to utilize the NO adsorption action to remove the $NO_x$ is performed. Note that, in the engine high load operating region III, as shown in FIG. 11C, the air-fuel ratio in the combustion chamber 5 is feedback controlled to the stoichiometric air-fuel ratio.

That is, in this embodiment according to the present invention, in an exhaust purification system of an internal combustion engine which is provided with a three-way catalyst 20 which is arranged in an engine exhaust passage, an $NO_x$ storage catalyst 22 which is arranged in the engine exhaust passage, stores $NO_x$ in exhaust gas when an air-fuel ratio of inflowing exhaust gas is lean, and releases the stored $NO_x$ when the air-fuel ratio of the inflowing exhaust gas is made rich, and a control device which controls the air-fuel ratio of the exhaust gas which flows into the $NO_x$ storage catalyst 22, the above-mentioned control device controls the air-fuel ratio so that the engine operating regions include a low load operating region I in which fuel is burned in the combustion chamber 5 by a lean base air-fuel ratio and in which the air-fuel ratio in the combustion chamber 5 is made rich when $NO_x$ should be released from the $NO_x$ storage catalyst 22, a medium load operating region II in which fuel is burned in the combustion chamber 5 by a base air-fuel ratio smaller than the base air-fuel ratio in the engine low load operating region I and in which the air-fuel ratio in the combustion chamber 5 is made rich by a period which is shorter than a rich period of the air-fuel ratio for releasing $NO_x$ in the engine low load operating region I, and a high load operating region III in which the air-fuel ratio in the combustion chamber 5 is feedback controlled to the stoichiometric air-fuel ratio. Note that, in the embodiment according to the present invention, the electronic control unit 30 forms the above-mentioned control device.

Note that, as will be understood from FIG. 11A to FIG. 11C, the base air-fuel ratio in the engine medium load operating region II is an intermediate value between the base air-fuel ratio in the engine low load operating region I and the stoichiometric air-fuel ratio. The degree of richness of the air-fuel ratio in the engine medium load operating region II when the air-fuel ratio in the combustion chamber 5 is made rich is smaller compared with the degree of richness of the air-fuel ratio when the air-fuel ratio in the combustion chamber 5 is made rich in the engine low load operating region I.

Now, in the engine medium load operating region II, an action of removal of $NO_x$ of utilizing the NO adsorption action is performed while burning the fuel under a lean air-fuel ratio. At this time, to perform the action of removal of $NO_x$ well at the $NO_x$ storage catalyst 22, the NO adsorption ability at the $NO_x$ storage catalyst 22 has to be increased. In this regard, when fuel is burned under a lean air-fuel ratio in this way, as explained above, NO and $O_2$ are adsorbed on the surface 61 of the platinum Pt in a competing manner. In this case, the greater the amount of NO around the platinum Pt 61 compared with the amount of $O_2$, the greater the amount of NO which is adsorbed on the surface 61 of the platinum Pt compared with the amount of $O_2$. Therefore, in the engine medium load operating region II, to increase the NO adsorption ability at the $NO_x$ storage catalyst 22 to secure a good $NO_x$ removal action, it is necessary to reduce the amount of oxygen around the platinum Pt 61, that is, the amount of oxygen which is present in the $NO_x$ storage catalyst 22.

On the other hand, when the action of removal of $NO_x$ is performed by utilizing the $NO_x$ storage and release action of the $NO_x$ storage catalyst 22 in the engine low load operating region I, the degree of leanness is large, so the $NO_x$ storage catalyst 22 is exposed to excessive oxygen. At this time, a large amount of oxygen is held on the $NO_x$ storage catalyst 22. Therefore, in the engine low load operating region I, when the action for removal of $NO_x$ is performed, there is a large amount of oxygen around the platinum Pt 61 of the $NO_x$ storage catalyst 22. In such a state, if the engine operating state shifts from the engine low load operating region I to the engine medium load operating region II, there is a large amount of oxygen present around the platinum Pt 61 of the $NO_x$ storage catalyst 22. As a result, for a short while even after the engine operating state shifts from the engine low load operating region I to the engine medium load operating region II, only a low $NO_x$ purification rate is obtained until the concentration of oxygen around the platinum Pt 61 of the $NO_x$ storage catalyst 22 decreases.

Furthermore, the catalyst temperature TC of the $NO_x$ storage catalyst 22 enabling a high $NO_x$ purification rate to be obtained at the time when the engine operating state is the engine medium load operating region II is higher compared with the catalyst temperature TC of the $NO_x$ storage catalyst 22 enabling a high $NO_x$ purification rate to be obtained at the time when the engine operating state is the engine low load operating region I. Therefore, to secure a high $NO_x$ purification rate when the engine operating state shifts from the engine low load operating region I to the engine medium load operating region II, the temperature of the $NO_x$ storage catalyst 22 has to be raised.

Therefore, in the embodiment according to the present invention, the above-mentioned control device temporarily makes the air-fuel ratio in the combustion chamber 5 rich when the engine operating state shifts from the engine low load operating region I to the engine medium load operating region II and makes the degree of richness of the air-fuel ratio at this time larger than the degree of richness when the air-fuel ratio in the combustion chamber 5 is made rich in the engine medium load operating region II. If the air-fuel ratio in the combustion chamber 5 is made rich when the engine operating state shifts from the engine low load operating region I to the engine medium load operating region II in this way, the oxygen which is present in the $NO_x$ storage catalyst 22 is consumed for oxidizing the reducing ingredients comprised of CO and HC in the exhaust gas. Therefore, the amount of oxygen which is present in the $NO_x$ storage catalyst 22 falls and as a result a high $NO_x$ purification rate can be secured in the engine medium load operating region II.

Further, if the air-fuel ratio in the combustion chamber 5 is made rich when the engine operating state shifts from the engine low load operating region I to the engine medium load operating region II, the reducing ingredients comprised of CO and HC which are included in the exhaust gas are oxidized by the oxygen which is present in the $NO_x$ storage catalyst 22, and the heat of the oxidation reaction at this time causes the temperature of the $NO_x$ storage catalyst 22 to rise. As a result, it becomes possible to obtain a high $NO_x$ purification rate. Further, at this time, the $NO_x$ which is stored in the $NO_x$ storage catalyst 22 is released.

Now, the purpose in making temporarily the air-fuel ratio in the combustion chamber 5 rich when the engine operating state is shifted from the engine low load operating region I to the engine medium load operating region II, is to consume the oxygen which is present in the $NO_x$ storage catalyst 22. At this time, to immediately consume the oxygen which is present in the $NO_x$ storage catalyst 22, as explained above, the degree of richness of the air-fuel ratio at this time is made larger than the degree of richness when the air-fuel ratio in the combustion chamber 5 is made rich in the engine medium load operating region II.

On the other hand, if the air-fuel ratio in the combustion chamber 5 is made rich when the engine operating state is shifted from the engine low load operating region I to the engine medium load operating region II, the oxygen which is present in the $NO_x$ storage catalyst 22 is consumed and the amount of oxygen which is present in the $NO_x$ storage catalyst 22 is decreased. When the amount of oxygen which is present in the $NO_x$ storage catalyst 22 in this way decreases, if maintaining the richness degree of the same air-fuel ratio, the amounts of the reducing ingredients comprised of CO and HC become excessive with respect to the amount of oxygen which is present in the $NO_x$ storage catalyst 22. As a result, the problem arises that the reducing ingredients comprised of CO and HC end up slipping through the $NO_x$ storage catalyst 22.

To prevent such a problem from being caused in this way, when the engine operating state is shifted from the engine low load operating region I to the engine medium load operating region II and the air-fuel ratio in the combustion chamber 5 is made rich, it is necessary to make the reducing ingredients comprised of CO and HC decrease the more the amount of oxygen which is present in the $NO_x$ storage catalyst 22 decreases. That is, when the engine operating state is shifted from the engine low load operating region I to the engine medium load operating region II, it is necessary to gradually make the degree of richness of the air-fuel ratio in the combustion chamber 5 gradually fall along with the elapse of time. Therefore, in the present invention, the above-mentioned control device temporarily makes the air-fuel ratio in the combustion chamber 5 rich when the engine operating state shifts from the engine low load operating region I to the engine medium load operating region II and makes the degree of richness of the air-fuel ratio at this time gradually fall in a state larger than the degree of richness when the air-fuel ratio in the combustion chamber 5 is made rich in the engine medium load operating region II.

Figure 15:
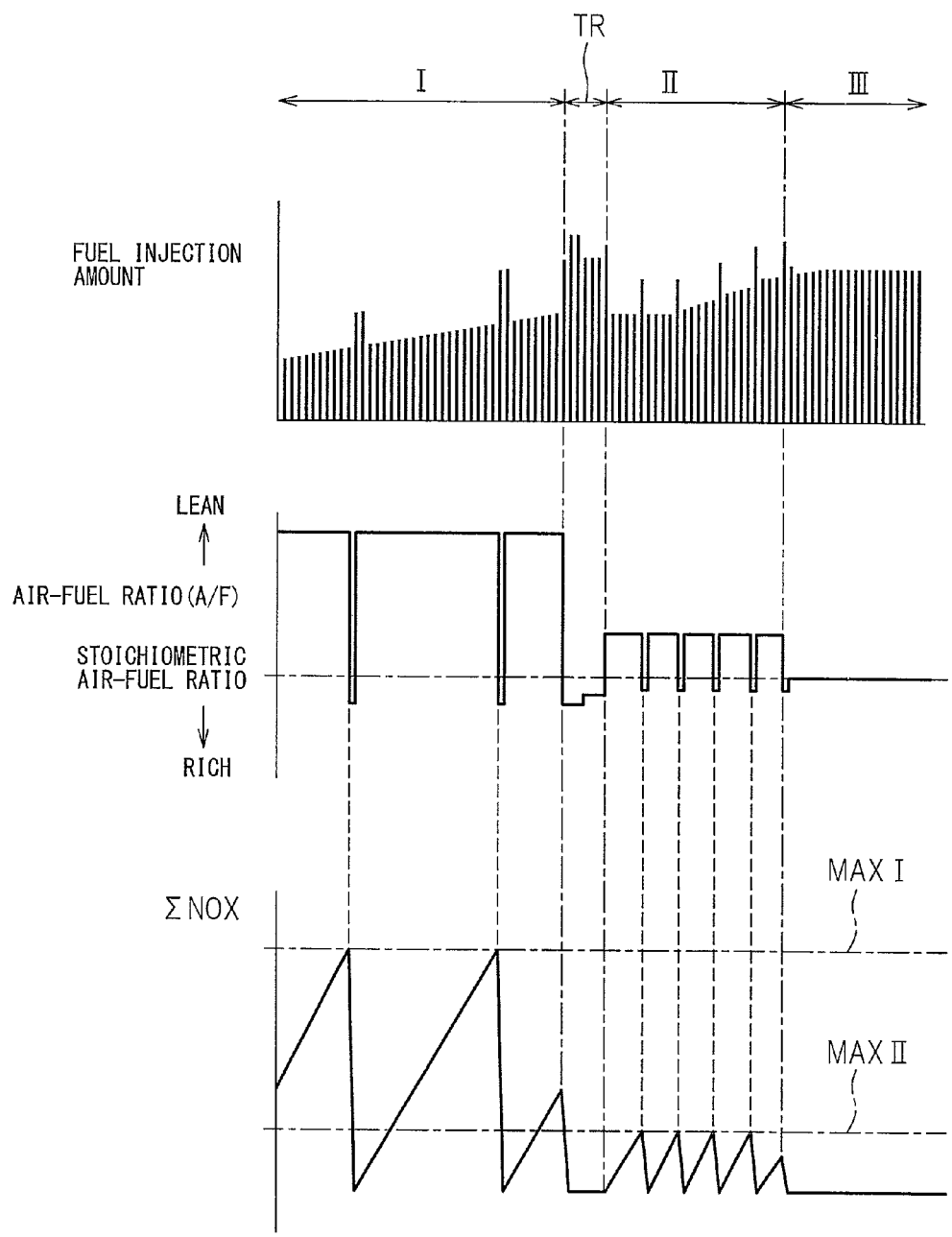
FIG. 15 is a time chart which shows changes of a fuel injection amount etc. at the time of engine operation.

FIG. 15 shows the $NO_x$ removal method which is performed when the engine operating state gradually shifts from low load operation to high load operation. Note that, FIG. 15 shows the change in the amount of fuel injection into the combustion chamber 5, the change in the air-fuel ratio (A/F) in the combustion chamber 5, and the change of the stored $NO_x$ amount ΣNOX. Further, in FIG. 15, MAXI shows the first allowable $NO_x$ storage amount, while MAXII shows the second allowable $NO_z$ storage amount. As clear from FIG. 15, the second allowable $NO_x$ storage amount MAXII is made a value smaller than the first allowable $NO_x$ storage amount MAXI.

Figure 16:
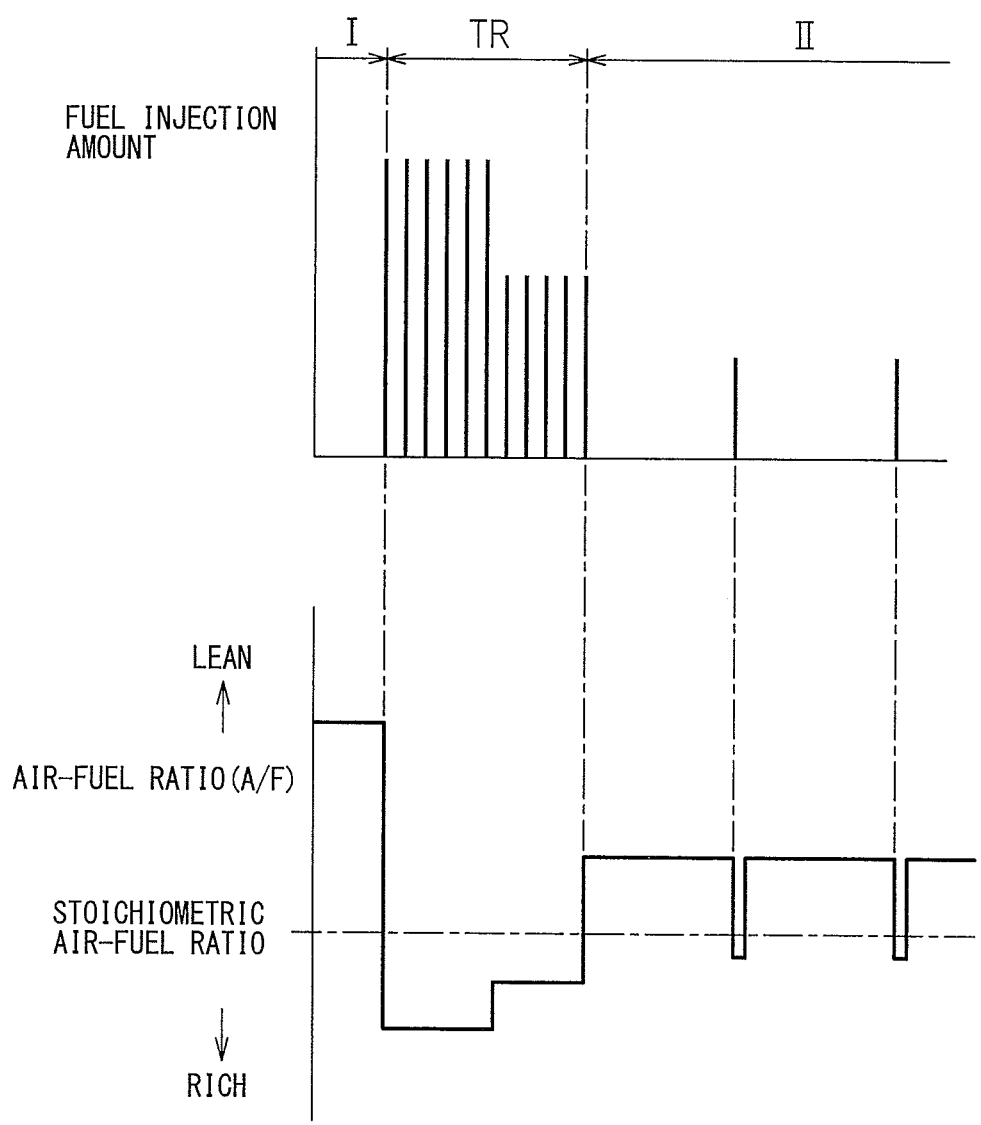
FIG. 16 is a time chart which shows part of FIG. 15 enlarged.

Now then, in FIG. 15, in the engine low load operating region I, if the stored $NO_x$ amount ΣNOX exceeds the first allowable $NO_x$ storage amount MAXI, the air-fuel ratio in the combustion chamber 5 is temporarily made rich. On the other hand, when the engine operating state shifts from the engine low load operating region I to the engine medium load operating region II, in the time period which is shown by TR in FIG. 15, the air-fuel ratio (A/F) in the combustion chamber 5 is temporarily made rich. The change in the air-fuel ratio (A/F) in the combustion chamber 5 at this time is shown enlarged in FIG. 16. As shown in FIG. 16, the degree of richness of the air-fuel ratio (A/F) in the time period TR is made to fall in stages in a state larger than the degree of richness when the air-fuel ratio (A/F) in the combustion chamber 5 is made rich in the engine medium load operating region II. During this time period TR, the oxygen which is present in the $NO_x$ storage catalyst 22 is consumed. Therefore, when the engine operating state shifts from the engine low load operating region I to the engine medium load operating region II, a high $NO_x$ purification rate can be immediately obtained.

In the engine medium load operating region II, as shown in FIG. 15, if the stored $NO_x$ amount ΣNOX exceeds the allowable $NO_x$ storage amount MAXII, the air-fuel ratio in the combustion chamber 5 is temporarily made rich. In this engine medium load operating region II, the temperature of the $NO_x$ storage catalyst 22 is high, so the $NO_x$ storage catalyst 22 does not absorb almost any $NO_x$ and the majority of the $NO_x$ is comprised of adsorbed NO. Therefore, explained another way, the amount of NO which is adsorbed at the $NO_x$ storage catalyst 22 is calculated, and when the engine is operating in the engine medium load operating region II and the NO adsorbed amount ΣNOX exceeds the predetermined allowable NO adsorbed amount MAXII, the air-fuel ratio (A/F) in the combustion chamber 5 is made rich.

In this way, in this embodiment according to the present invention, the $NO_x$ storage amount ΣNOX which is stored in the $NO_x$ storage catalyst 22 is calculated. When the engine is operating in the engine low load operating region I and the $NO_x$ storage amount ΣNOX exceeds the predetermined first allowable $NO_x$ storage amount MAXI, the air-fuel ratio (A/F) in the combustion chamber 5 is made rich, while when the engine is operating in the engine medium load operating region II and the $NO_x$ storage amount ΣNOX exceeds the predetermined second allowable $NO_x$ storage amount MAXII, the air-fuel ratio (A/F) in the combustion chamber 5 is made rich. The second allowable $NO_x$ storage amount MAXII is made a value smaller than the first allowable $NO_x$ storage amount MAXI.

On the other hand, as shown in FIG. 15, in the embodiment of the present invention, also when the engine operating state shifts from the engine medium load operating region II to the engine high load operating region III, the air-fuel ratio (A/F) in the combustion chamber 5 is temporarily made rich so as to release $NO_x$ from the $NO_x$ storage catalyst 22. Next, in the engine high load operating region III, the feedback control of the amounts of injection from the fuel injectors 11 and 12 is performed based on the output signal of the air-fuel ratio sensor 27 so that the air-fuel ratio in the combustion chamber 5 becomes the stoichiometric air-fuel ratio. At this time, the harmful ingredients HC, CO, and $NO_x$ which are contained in the exhaust gas are simultaneously removed at the three-way catalyst 20.

Note that, if the air-fuel ratio is made rich as shown in FIG. 15, at this time, sometimes ammonia is produced. However, in the embodiment according to the present invention, this ammonia is adsorbed at the $NO_x$ selective reduction catalyst 23. This ammonia which is adsorbed at the $NO_x$ selective reduction catalyst 23 reacts with the $NO_x$ which is contained in the exhaust gas and is used for reducing the $NO_x$.

Figure 17:
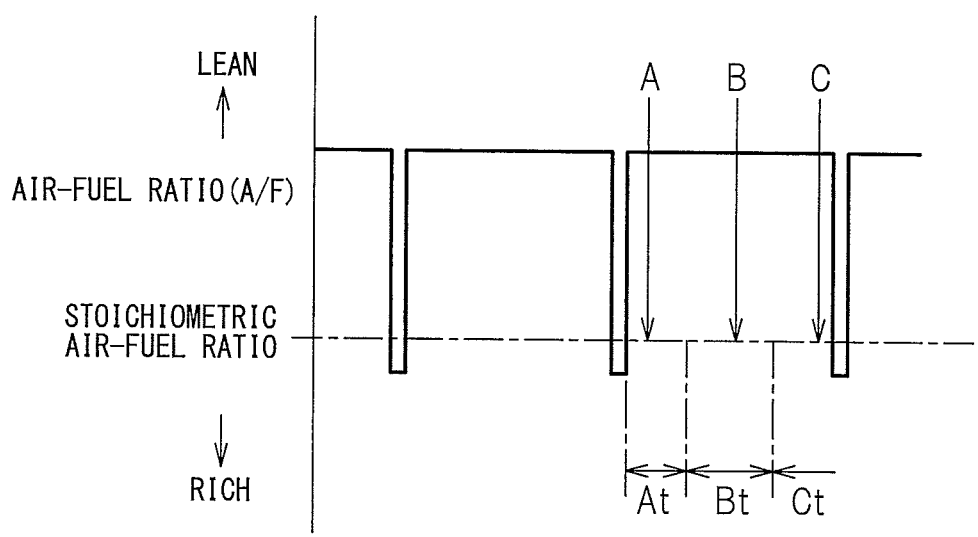
FIG. 17 is a view which shows a timing when an engine operating state shifts from an engine low load operating region to an engine medium load operating region.

In this regard, the amount of oxygen which is present in the $NO_x$ storage catalyst 22 when the engine operating state shifts from the engine low load operating region I to the engine medium load operating region II changes depending on the timing at which the engine operating state shifts from the engine low load operating region I to the engine medium load operating region II. FIG. 17 shows the change in the air-fuel ratio (A/F) in the combustion chamber 5 when the action of removal of $NO_x$ which utilizes the $NO_x$ storage and release action of the $NO_x$ storage catalyst 22 is performed in the engine low load operating region I. Furthermore, FIG. 17 shows the three timings A, B, and C when the engine operating state shifts from the engine low load operating region I to the engine medium load operating region II and predetermined elapsed time regions At, Bt, and Ct from when the air-fuel ratio (A/F) in the combustion chamber 5 is made rich.

When the engine operating state shifts from the engine low load operating region I to the engine medium load operating region II at the timing A in the elapsed time region At which is shown in FIG. 17, the amount of oxygen which is present in the $NO_x$ storage catalyst 22 is considerably small. As opposed to this, when the engine operating state shifts from the engine low load operating region I to the engine medium load operating region II at the timing B in the elapsed time region Bt which is shown in FIG. 17, the amount of oxygen which is present in the $NO_x$ storage catalyst 22 becomes greater, while the engine operating state shifts from the engine low load operating region I to the engine medium load operating region II at the timing C in the elapsed time region Ct which is shown in FIG. 17, the amount of oxygen which is present in the $NO_x$ storage catalyst 22 becomes further greater. Therefore, in this embodiment according to the present invention, the method of changing the rich air-fuel ratio is changed in accordance with the timing when the engine operating state is made to shift from the engine low load operating region I to the engine medium load operating region II.

That is, in this embodiment, if the engine operating state shifts from the engine low load operating region I to the engine medium load operating region II at the timing C in the elapsed time region Ct which is shown in FIG. 17, in other words, if the amount of oxygen which is present in the $NO_x$ storage catalyst 22 becomes considerably large, as shown in FIG. 18C, the degree of richness of the air-fuel ratio is made to gradually fall in stages in a state larger than the degree of richness when the air-fuel ratio in the combustion chamber 5 is made rich in the engine medium load operating region II. That is, in this case, the change in the richness degree of the air-fuel ratio (A/F) in the combustion chamber 5 is made the same as the change in the richness degree which is shown in the already explained FIG. 16.

As opposed to this, in this embodiment, when the engine operating state shifts from the engine low load operating region I to the engine medium load operating region II at the timing B in the elapsed time region Bt which is shown in FIG. 17, in other words, when the amount of oxygen which is present in the $NO_x$ storage catalyst 22 is smaller than at the time of the timing C, as shown in FIG. 18B, the degree of richness of the air-fuel ratio is made a fixed value which is larger than the degree of richness when the air-fuel ratio in the combustion chamber 5 is made rich in the engine medium load operating region II. That is, at this time, the degree of richness is made the same as the maximum degree of richness at the time of the timing C, but the time period where it is made rich is shorter than the time period where the degree of richness is made maximum at the time of the timing C.

On the other hand, when the engine operating state shifts from the engine low load operating region I to the engine medium load operating region II at the timing A in the elapsed time region At which is shown in FIG. 17, in other words, when the amount of oxygen which is present in the $NO_x$ storage catalyst 22 is considerably small, as shown in FIG. 18A, the degree of richness of the air-fuel ratio is made the degree of richness when the air-fuel ratio in the combustion chamber 5 is made rich in the engine medium load operating region II. That is, at this time, if the engine operating state shifts from the engine low load operating region I to the engine medium load operating region II at the timing A which is shown in FIG. 17, the action of removing $NO_x$ which utilizes the NO adsorption action is immediately started.

In this way, in this embodiment, when the elapsed time from when the air-fuel ratio in the combustion chamber 5 is made rich in the engine low load operating region I to when the engine operating state is shifted to the engine medium load operating region II is in the predetermined elapsed time region Ct, the degree of richness of the air-fuel ratio in the combustion chamber 5 is made to gradually fall in a state larger than the degree of richness when the air-fuel ratio in the combustion chamber 5 is made rich in the engine medium load operating region II. Further, in this embodiment, when the elapsed time from when the air-fuel ratio in the combustion chamber 5 is made rich in the engine low load operating region I to when the engine operating state is shifted to the engine medium load operating region II is in the predetermined elapsed time region Bt which is shorter in elapsed time than the above-mentioned elapsed time region Ct, the degree of richness of the air-fuel ratio in the combustion chamber 5 is made a constant value which is larger than the degree of richness when the air-fuel ratio in the combustion chamber 5 is made rich in the engine medium load operating region II.

Furthermore, in this embodiment, when the elapsed time in the engine low load operating region I from when the air-fuel ratio in the combustion chamber 5 is made rich to when the engine operating state is shifted to the engine medium load operating region II is in the predetermined elapsed time region At with a shorter elapsed time than the elapsed time region Bt, the degree of richness of the air-fuel ratio in the combustion chamber 5 is made the degree of richness in the engine medium load operating region II and $NO_x$ removal action which utilizes the NO adsorption action is immediately started.

Now, the catalyst temperature TC of the $NO_x$ storage catalyst 22 which can give a high $NO_x$ purification rate when the engine operating state is in the engine low load operating region I is lower than the catalyst temperature TC of the $NO_x$ storage catalyst 22 which can give a high $NO_x$ purification rate when the engine operating state is in the engine medium load operating region II. Therefore, to secure a high $NO_x$ purification rate when the engine operating state shifts from the engine medium load operating region II to the engine low load operating region I, the temperature of the $NO_x$ storage catalyst 22 is preferably made to fall. Therefore, in this embodiment according to the present invention, when the engine operating state shifts from the engine medium load operating region II to the engine low load operating region I, the air-fuel ratio in the combustion chamber 5 is temporarily made larger. This will be explained with reference to FIG. 19.

FIG. 19 shows an $NO_x$ removal method which is performed when the engine operating state gradually shifts from high load operation to low load operation. Note that, FIG. 19 shows the change in the amount of fuel injected into the combustion chamber 5, the change of the air-fuel ratio (A/F) in the combustion chamber 5, and the change of the stored $NO_x$ amount ΣNOX. As shown in FIG. 19, when the engine operating state shifts from the engine medium load operating region II to the engine low load operating region I, to release the $NO_x$ which is stored in the $NO_x$ storage catalyst 22, the air-fuel ratio (A/F) in the combustion chamber 5 is made rich, and thus, in the fixed time period TR, the base air-fuel ratio is made larger than the base air-fuel ratio in the engine low load operating region I. The change in the air-fuel ratio (A/F) in the combustion chamber 5 at this time is shown enlarged in FIG. 20A. In this way, when the engine operating state shifts from the engine medium load operating region II to the engine low load operating region I, if the base air-fuel ratio is temporarily made larger than the base air-fuel ratio in the engine low load operating region I, the combustion temperature falls and the exhaust gas temperature falls. As a result, the temperature of the $NO_x$ storage catalyst 22 falls down to a temperature which gives a high $NO_x$ purification rate and due to this a high $NO_x$ purification rate can be obtained.

On the other hand, if increasing the amount of recirculation exhaust gas which is recirculated into the combustion chamber 5, the combustion temperature falls. Therefore, it is possible to increase the amount of recirculation exhaust gas to make the temperature of the $NO_x$ storage catalyst 22 fall to a temperature able to give a high $NO_x$ purification rate. Therefore, in another embodiment, when the engine operating state shifts from the engine medium load operating region II to the engine low load operating region I, as shown in FIG. 20B, the opening degree of the EGR control valve 25 is made larger than the opening degree in the engine low load operating region I over the time period TR and the amount of recirculation exhaust gas which is recirculated into the combustion chamber 5 is made to increase.

Figure 21:
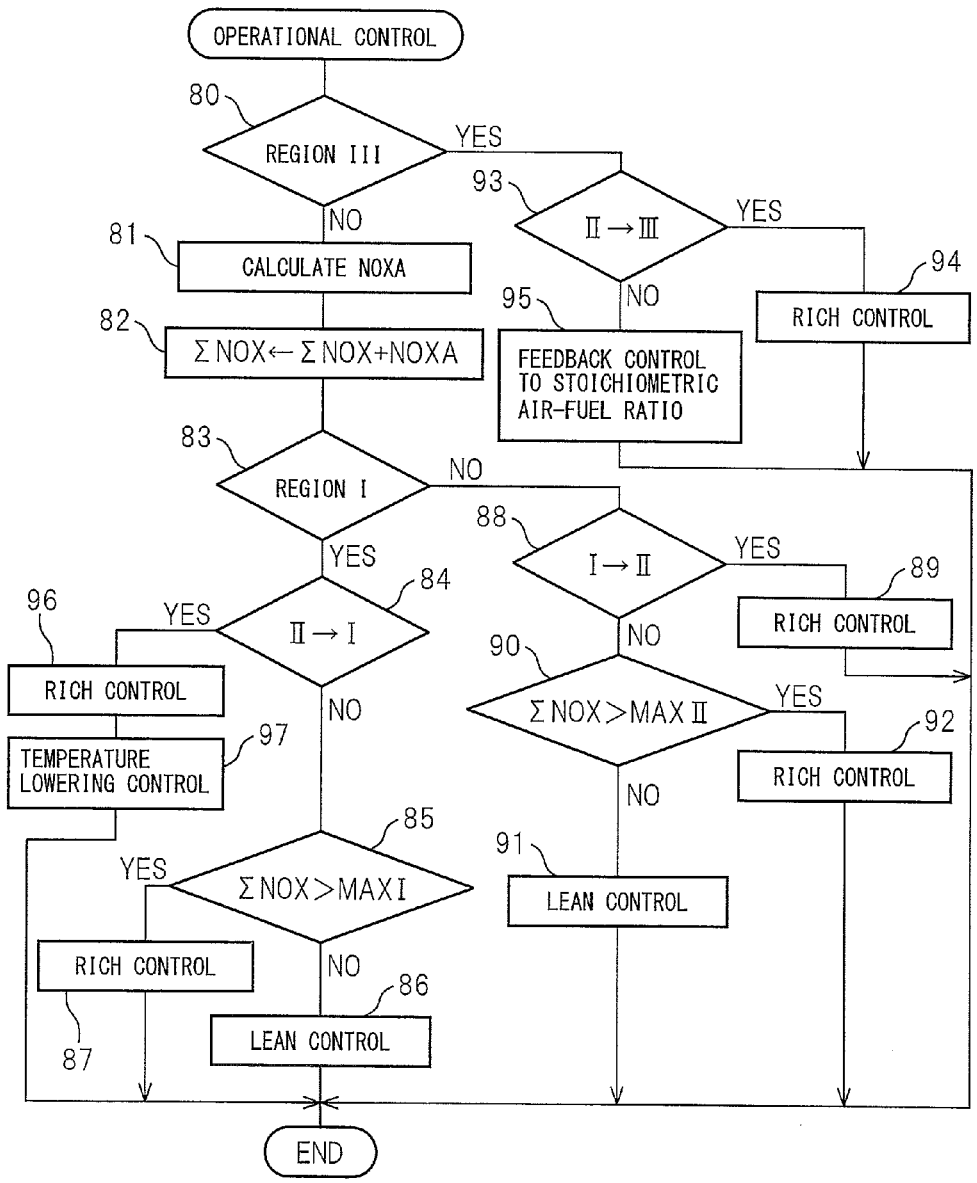
FIG. 21 is a flow chart for control of engine operation.

FIG. 21 shows an operational control routine. This routine is executed by interruption every certain time period.

Referring to FIG. 21, first, at step 80, it is judged if the engine operating state is the engine high load operating region III which is shown in FIG. 14. When the engine operating state is not the engine high load operating region III, the routine proceeds to step 81 where the $NO_x$ amount NOXA which is exhausted per unit time is calculated from the map which is shown in FIG. 6. Next, at step 82, the exhausted $NO_x$ amount NOCA is added to ΣNOX whereby the stored $NO_x$ amount ΣNOX is calculated. Next, at step 83, it is judged if the engine operating state is the engine low load operating region I which is shown in FIG. 14. When the engine operating state is the engine low load operating region I which is shown in FIG. 14, the routine proceeds to step 84.

At step 84, it is judged if the engine operating state has now shifted from the engine medium load operating region II to the engine low load operating region I. When the engine operating state has not now shifted from the engine medium load operating region II to the engine low load operating region I, that is, when the engine operating state has already shifted from the engine medium load operating region II to the engine low load operating region I, the routine proceeds to step 85 where it is judged if the $NO_x$ storage amount ΣNOX exceeds the first allowable $NO_x$ storage amount MAXI. When the $NO_x$ storage amount ΣNOX does not exceed the first allowable $NO_x$ storage amount MAXI, the routine proceeds to step 86 where the air-fuel ratio in the combustion chamber 5 is made a lean air-fuel ratio which is predetermined in accordance with the engine operating state. At this time, the fuel is burned under a lean base air-fuel ratio. As opposed to this, when it is judged at step 85 that the $NO_x$ storage amount KNOX exceeds the first allowable $NO_x$ storage amount MAXI, the routine proceeds to step 87 where the air-fuel ratio in the combustion chamber 5 is temporarily made rich and ΣNOX is cleared. At this time, the $NO_x$ which was stored at the $NO_x$ storage catalyst 22 is released from the $NO_x$ storage catalyst 22.

On the other hand, when it is judged at step 83 that the engine operating state is not the engine low load operating region I which is shown in FIG. 14, that is, when it is judged that the engine operating state is the engine medium load operating region II which is shown in FIG. 14, the routine proceeds to step 88 where it is judged if the engine operating state has now shifted from the engine low load operating region I to the engine medium load operating region II. When the engine operating state has now shifted from the engine low load operating region I to the engine medium load operating region II, the routine proceeds to step 89 where the air-fuel ratio in the combustion chamber 5 is temporarily made rich. At this time, the degree of richness of the air-fuel ratio in the combustion chamber 5, as shown in FIG. 16, is made to gradually fall in a state larger than the degree of richness when the air-fuel ratio in the combustion chamber 5 is made rich in the engine medium load operating region II.

Note that, in this case, if the elapsed time from when the air-fuel ratio in the combustion chamber 5 is made rich in the engine low load operating region I to when the engine operating state shifts to the engine medium load operating region II is in the predetermined elapsed time region Ct, the degree of richness of the air-fuel ratio, as shown in FIG. 18C, may gradually made to fall in a state larger than the degree of richness when the air-fuel ratio in the combustion chamber 5 is made rich in the engine medium load operating region II, while when the elapsed time from when the air-fuel ratio in the combustion chamber 5 is made rich in the engine low load operating region I to when the engine operating state is shifted to the engine medium load operating region II is in the predetermined elapsed time region Bt, as shown in FIG. 18B, the degree of richness of the air-fuel ratio may be made a constant value larger than the degree of richness when the air-fuel ratio in the combustion chamber 5 is made rich in the engine medium load operating region II.

On the other hand, when it is judged at step 88 that the engine operating state has already shifted from the engine low load operating region I to the engine medium load operating region II, the routine proceeds to step 90 where it is judged if the $NO_x$ storage amount ΣNOX exceeds the second allowable $NO_x$ storage amount MAXII. When the $NO_x$ storage amount ΣNOX does not exceed the second allowable $NO_x$ storage amount MAXII, the routine proceeds to step 91 where the air-fuel ratio in the combustion chamber 5 is made a predetermined lean air-fuel ratio in accordance with the engine operating state. At this time, the fuel is burned under a lean base air-fuel ratio. Note that, the base air-fuel ratio at this time is smaller than the base air-fuel ratio in the engine low load operating region I. As opposed to this, when it is judged at step 90 that the $NO_x$ storage amount ΣNOX exceeds the second allowable $NO_x$ storage amount MAXII, the routine proceeds to step 92 where the air-fuel ratio in the combustion chamber 5 is temporarily made rich and the ΣNOX is cleared. At this time, the $NO_x$ which was stored at the $NO_x$ storage catalyst 22 is released from the $NO_x$ storage catalyst 22.

On the other hand, when it is judged at step 80 that the engine operating state is the engine high load operating region III which is shown in FIG. 14, the routine proceeds to step 93 where it is judged if the engine operating state has shifted from the engine medium load operating region II to the engine high load operating region III. When the engine operating state has now shifted from the engine medium load operating region II to the engine high load operating region III, the routine proceeds to step 94 where the air-fuel ratio in the combustion chamber 5 is temporarily made rich. As opposed to this, when the engine operating state has already shifted from the engine medium load operating region II to the engine high load operating region III, the routine proceeds to step 95. At step 95, the air-fuel ratio in the combustion chamber 5 is feedback controlled to the stoichiometric air-fuel ratio.

On the other hand, when it is judged at step 84 that the engine operating state has now shifted from the engine medium load operating region II to the engine low load operating region I, the routine proceeds to step 96 where the air-fuel ratio in the combustion chamber 5 is temporarily made rich and ΣNOX is cleared. At this time, the $NO_x$ which was stored at the $NO_x$ storage catalyst 22 is released from the $NO_x$ storage catalyst 22. Next, at step 97, temperature lowering control is performed to make the temperature of the $NO_x$ storage catalyst 22 fall. That is, at this time, as shown in FIG. 20A, the opening degree of the throttle valve 18 is made larger over the time period TR or, as shown in FIG. 20B, the opening degree of the EGR control valve 25 is made larger over the time period TR.

REFERENCE SIGNS LIST

5 combustion chamber
6 spark plug
11, 12 fuel injector
14 surge tank
19 exhaust manifold
20 three-way catalyst
22 $NO_x$ storage catalyst

The invention claimed is:

1. An exhaust purification system of an internal combustion engine comprising:
   a three-way catalyst which is arranged in an engine exhaust passage;
   an $NO_x$ storage catalyst which is arranged in the engine exhaust passage, the $NO_x$ storage catalyst storing $NO_x$ in exhaust gas when an air-fuel ratio of inflowing exhaust gas is lean, and releasing the stored $NO_x$ when the air-fuel ratio of the inflowing exhaust gas is made rich; and
   an electronic control unit configured to control the air-fuel ratio of the exhaust gas which flows into the $NO_x$ storage catalyst so that engine operating regions include:
      a low load operating region in which fuel is burned in a combustion chamber by a lean base air-fuel ratio, and in which the air-fuel ratio in the combustion chamber is made rich when $NO_x$ should be released from the $NO_x$ storage catalyst;
      a medium load operating region in which fuel is burned in the combustion chamber by a base air-fuel ratio smaller than the base air-fuel ratio in the engine low load operating region, and in which the air-fuel ratio in the combustion chamber is made rich by a period which is shorter than a rich period of the air-fuel ratio for releasing $NO_x$ in the engine low load operating region; and
      a high load operating region in which the air-fuel ratio in the combustion chamber is feedback controlled to a stoichiometric air-fuel ratio, and
   the electronic control unit is further configured to control the air-fuel ratio so as to make the air-fuel ratio in the combustion chamber temporarily rich when the engine operating state shifts from the engine low load operating region to the engine medium load operating region, and make a degree of richness of the air-fuel ratio at this time gradually fall in a state larger than the degree of richness when the air-fuel ratio in the combustion chamber is made rich in the engine medium load operating region.

2. The exhaust purification system of claim 1, wherein when an elapsed time from when the air-fuel ratio in the combustion chamber is made rich in the engine low load operating region to when the engine operating state is shifted to the engine medium load operating region is within a first predetermined elapsed time region, the degree of richness of the air-fuel ratio is made to gradually fall in a state larger than the degree of richness when the air-fuel ratio in the combustion chamber is made rich in the engine medium load operating region.

3. The exhaust purification system of claim 2, wherein when an elapsed time from when the air-fuel ratio in the combustion chamber is made rich in the engine low load operating region to when the engine operating state is shifted to the engine medium load operating region is within a second predetermined elapsed time region which is shorter in elapsed time that the first predetermined elapsed time region, the degree of richness of the air-fuel ratio is made a constant value which is larger than the degree of richness when the air-fuel ratio in the combustion chamber is made rich in the engine medium load operating region.

4. The exhaust purification system of claim 1, wherein when an $NO_x$ storage amount which is stored in the $NO_x$ storage catalyst is calculated, the air-fuel ratio in the combustion chamber is made rich when the $NO_x$ storage amount exceeds a predetermined first allowable $NO_x$ storage amount if the engine is operating at the engine low load operating region, the air-fuel ratio in the combustion chamber is made rich when the $NO_x$ storage amount exceeds a predetermined second allowable $NO_x$ storage amount in the engine medium load operating region after the air-fuel ratio in the combustion chamber is temporarily made rich when the engine operating state shifts from the engine low load operating region to the engine medium load operating region, and the second allowable $NO_x$ storage amount is made a smaller value compared with the first allowable $NO_x$ storage amount.

5. The exhaust purification system of claim 1, wherein when the engine operating state shifts from the engine medium load operating region to the engine low load operating region, the base air-fuel ratio in the engine medium load operating region is temporarily made larger than the base air-fuel ratio at the engine low load operating region.

6. The exhaust purification system of claim 1, wherein when the engine operating state shifts from the engine medium load operating region to the engine low load operating region, an amount of recirculation exhaust gas which is recirculated in the engine combustion chamber is temporarily increased over an amount of recirculation exhaust gas in the engine low load operating region.

* * * * *